(12) United States Patent
Chen

(10) Patent No.: US 12,289,000 B2
(45) Date of Patent: Apr. 29, 2025

(54) CHARGING AND DISCHARGING CONTROL OF ENERGY DEVICES IN A POWER SYSTEM

(71) Applicant: Entrantech Inc., Gilroy, CA (US)

(72) Inventor: Kong-Chen Chen, Gilroy, CA (US)

(73) Assignee: ENTRANTECH INC., Gilroy, CA (US)

(*) Notice: Subject to any disclaimer, the term of this patent is extended or adjusted under 35 U.S.C. 154(b) by 0 days.

(21) Appl. No.: 18/099,890

(22) Filed: Jan. 20, 2023

(65) Prior Publication Data

US 2023/0155397 A1    May 18, 2023

Related U.S. Application Data

(63) Continuation-in-part of application No. 17/884,984, filed on Aug. 10, 2022, now Pat. No. 11,777,323, which is a continuation-in-part of application No. 17/402,435, filed on Aug. 13, 2021, now Pat. No. 11,837,968, and a continuation-in-part of application No. 17/398,355, filed on Aug. 10, 2021, now Pat. No. 11,489,455.

(Continued)

(51) Int. Cl.
*H02J 7/00* (2006.01)
*B60L 53/80* (2019.01)
*H02M 1/00* (2006.01)
*H02M 7/25* (2006.01)

(52) U.S. Cl.
CPC ............ *H02J 7/0025* (2020.01); *B60L 53/80* (2019.02); *H02J 7/00304* (2020.01); *H02J 7/00308* (2020.01); *H02J 7/00309* (2020.01); *H02M 1/0029* (2021.05); *H02M 7/25* (2013.01)

(58) Field of Classification Search
CPC .................................................. H02J 7/0025
USPC ......................................................... 320/116
See application file for complete search history.

(56) References Cited

U.S. PATENT DOCUMENTS 5,786,642 A     7/1998  Wilhelm
6,320,359 B1   11/2001  Nagaya et al.
(Continued)

FOREIGN PATENT DOCUMENTS

CN       110249475 B    7/2022
TW         1451656 B    9/2014
(Continued)

OTHER PUBLICATIONS

International Preliminary Report on Patentability dated Jun. 1, 2023, in Application No. PCT/US2021/059792.
(Continued)

*Primary Examiner* — Joseph Chang
(74) *Attorney, Agent, or Firm* — Ardeshir Tabibi; Weaver Austin Villeneuve & Sampson LLP

(57) ABSTRACT

A control switch incorporating a 1:2 demultiplexer is used to control timing for a concurrent switching, break-before-make and make-before-break power multiplexing, and is configurable to link a plurality of the control switches into a control chain to perform sequential charging, sequential discharging, parallel charging, parallel discharging, and concurrent sequential charging and discharging for a plurality of batteries coupled to the control chain in a power system.

26 Claims, 20 Drawing Sheets

Related U.S. Application Data

(60) Provisional application No. 63/424,859, filed on Nov. 11, 2022, provisional application No. 63/356,484, filed on Jun. 29, 2022, provisional application No. 63/065,341, filed on Aug. 13, 2020.

(56) References Cited

U.S. PATENT DOCUMENTS

| | | |
|---|---|---|
| 6,498,457 B1 | 12/2002 | Tsuboi |
| 6,798,666 B1 | 9/2004 | Alexander et al. |
| 8,148,844 B2 | 4/2012 | Pan |
| 10,840,735 B1 | 11/2020 | Cooper |
| 11,183,851 B1 | 11/2021 | Chen |
| 11,476,657 B2 | 10/2022 | Chen |
| 11,489,455 B2 | 11/2022 | Chen |
| 11,605,970 B2 | 3/2023 | Chen |
| 11,777,323 B2 | 10/2023 | Chen |
| 11,837,968 B2 | 12/2023 | Chen |
| 2004/0085043 A1 | 5/2004 | Germagian et al. |
| 2005/0225955 A1 | 10/2005 | Grebenkemper et al. |
| 2005/0237724 A1 | 10/2005 | Fiorentino et al. |
| 2006/0244620 A1 | 11/2006 | Sotiriou |
| 2011/0053394 A1 | 3/2011 | Hood, III et al. |
| 2012/0118602 A1 | 5/2012 | Remmert |
| 2013/0015714 A1 | 1/2013 | Kwok |
| 2014/0184159 A1 | 7/2014 | Kachi |
| 2015/0022001 A1 | 1/2015 | Goei et al. |
| 2015/0048767 A1 | 2/2015 | Takezawa |
| 2015/0054343 A1 | 2/2015 | Cui |
| 2015/0348733 A1 | 12/2015 | Shi et al. |
| 2016/0028230 A1* | 1/2016 | Elfman ............... B60R 16/0231 318/504 |
| 2018/0212420 A1 | 7/2018 | Chen |
| 2018/0226797 A1 | 8/2018 | Galin et al. |
| 2018/0375435 A1 | 12/2018 | Muhoberac et al. |
| 2019/0081571 A1 | 3/2019 | Chung et al. |
| 2019/0229546 A1 | 7/2019 | Hartl |
| 2019/0288532 A1 | 9/2019 | Mattos et al. |
| 2020/0175551 A1 | 6/2020 | Penilla et al. |
| 2020/0381917 A1 | 12/2020 | Takeda |
| 2022/0014014 A1 | 1/2022 | Chen |
| 2022/0052618 A1 | 2/2022 | Chen |
| 2022/0052619 A1 | 2/2022 | Chen |
| 2022/0158482 A1 | 5/2022 | Chen |
| 2022/0340039 A1 | 10/2022 | Unagami et al. |
| 2022/0393488 A1 | 12/2022 | Chen |
| 2023/0155398 A1 | 5/2023 | Chen |
| 2023/0155401 A1 | 5/2023 | Kuranuki et al. |
| 2023/0352947 A1 | 11/2023 | Chen |

FOREIGN PATENT DOCUMENTS

| | | |
|---|---|---|
| TW | 1460960 B | 11/2014 |
| TW | 202213896 A | 4/2022 |

OTHER PUBLICATIONS

International Search Report & Written Opinion dated May 3, 2022 (ISA/US) in PCT Application PCT/US2021/059792.

U.S Advisory Action dated Mar. 22, 2023 in U.S. Appl. No. 17/402,435.
U.S. Corrected Notice of Allowance dated Feb. 14, 2023 in U.S. Appl. No. 17/667,457.
U.S. Corrected Notice of Allowance dated Jul. 18, 2022 in U.S. Appl. No. 17/398,355.
U.S. Corrected Notice of Allowance dated Jun. 21, 2022 in U.S. Appl. No. 16/950,882.
U.S. Corrected Notice of Allowance dated Nov. 17, 2022 in U.S. Appl. No. 17/667,457.
U.S. Corrected Notice of Allowance dated Oct. 6, 2022 in U.S. Appl. No. 17/398,355.
U.S. Corrected Notice of Allowance dated Sep. 20, 2022 in U.S. Appl. No. 16/950,882.
U.S. Final office Action dated Jan. 19, 2023 in U.S. Appl. No. 17/402,435.
U.S. Non-Final office Action dated Aug. 24, 2022 in U.S. Appl. No. 17/402,435.
U.S. Notice of Allowance dated Apr. 19, 2023 in U.S. Appl. No. 17/884,984.
U.S. Notice of Allowance dated Aug. 10, 2023 in U.S. Appl. No. 17/884,984.
U.S. Notice of Allowance dated Feb. 15, 2022 in U.S. Appl. No. 16/950,882.
U.S. Notice of Allowance dated Jul. 5, 2023 in U.S. Appl. No. 17/402,435.
U.S. Notice of Allowance dated Jul. 7, 2022 in U.S. Appl. No. 17/398,355.
U.S. Notice of Allowance dated Jul. 27, 2021 in U.S. Appl. No. 17/062,413.
U.S. Notice of Allowance dated Jun. 9, 2022 in U.S. Appl. No. 16/950,882.
U.S. Notice of Allowance dated May 11, 2023 in U.S. Appl. No. 17/884,984.
U.S. Notice of Allowance dated Nov. 3, 2022 in U.S. Appl. No. 17/667,457.
U.S. Notice of Allowance dated Nov. 3, 2023 in U.S. Appl. No. 17/402,435.
U.S. Notice of Allowance dated Apr. 11, 2024 in U.S. Appl. No. 18/099,895.
TW Office Action dated Aug. 29, 2024 in TW Application No. 113101506 with English translation.
U.S. Non-Final Office Action dated Oct. 15, 2024 in U.S. Appl. No. 18/217,982.
U.S. Non-Final Office Action dated Oct. 30, 2024 in U.S. Appl. No. 18/099,895.
U.S. Notice of Allowance dated Jul. 22, 2024 in U.S. Appl. No. 18/099,895.
U.S. Advisory Action dated Feb. 5, 2025 in U.S. Appl. No. 18/099,895.
U.S. Final Office Action dated Dec. 17, 2024 in U.S. Appl. No. 18/099,895.
U.S. Notice of Allowance dated Feb. 13, 2025 in U.S. Appl. No. 18/217,982.
U.S. Appl. No. 19/023,085, inventor Chen K, filed on Jan. 15, 2025.
U.S. Appl. No. 19/033,374, inventor Chen K, filed on Jan. 21, 2025.

* cited by examiner

US 12,289,000 B2

CHARGING AND DISCHARGING CONTROL OF ENERGY DEVICES IN A POWER SYSTEM

CROSS REFERENCE TO RELATED APPLICATIONS

This application claims priority, under U.S.C. § 119, from U.S. Provisional Application No. 63/424,859, filed on Nov. 11, 2022, entitled "Apparatus and Method for Charging and Discharging Batteries in a Power System", the contents of which is incorporated herein by referred in its entirety. The present application is also a continuation-in-part of application Ser. No. 17/884,984, filed on Aug. 10, 2022, entitled "Sequential Power Discharge for Batteries in a Power System", the content of which is incorporated herein by referred in their entirety.

FIELD OF THE INVENTION

The present invention relates to control switches applicable for concurrent switching, break-before-make or make-before-make power multiplexing, configurable for charging, discharging, or a combined charging and discharging use, and linkable into a charging or a discharging control chain for sequential and parallel operations, and into a charging and discharging combined control chain to control operation for a plurality of energy storage devices in a power system automatically.

BACKGROUND

In conventional power switches or power multiplexers, when several of such switches or multiplexers are cascaded into a chain configuration for power output control, a microcontroller is often used to control the order of their outputs. Commercially available power multiplexers may be linkable to control power sequencing without the use of an external microcontroller, such as the Texas Instrument® TPS22990 power sequencer or TPS25942x Power MUX. However, their power multiplexing requires to monitor the power output status of a prior control switch in order to switch over to a subsequent control switch when switching between two neighboring control switches.

For example, the TPS22900 power sequencer, which connects the Power Good (PG) output from a prior TPS22900 switch to enable the ON-input signal of a subsequent TPS22900 switch, where only after its open drain PG output signal is pulled to a logic high and is sensed by the ON-input pin at a subsequent TPS22900 device, then can the subsequent one be switched on for power output. There may be a voltage gap between the output of two TPS22900 switches during such a "break-before-make" power switching.

Similarly, the TPS25942x Power Mux may use a similar pull-up PGOOD to interface with the Over-Voltage Protection (OVP) input pin on a subsequent TPS25942x Power Mux, which is also a break-before-make switching. However, the Diode Mode control pin (DMODE) in the chip may be used for a "make-before-break" power multiplexing control. The make-before-break switching means the second switch is turned-on for power output before the first switch is turned off. The make-before-break switching is good for power switching between two power sources at same voltage. Regardless of a break-before-make or a make-before-break power switching, a drawback in most conventional switches is that a handshake is required for a successor switch to monitor the power status of a predecessor switch to determine when a control switchover may take place.

SUMMARY

In an embodiment, control switches applicable for concurrently switching, break-before-make or make-before-break power multiplexing, and configurable for charging, discharging, or charging and discharging use are disclosed. An embodiment linking a plurality of control switches into a charging, discharging, or charging and discharging control chain to perform sequential and parallel power operations for a plurality of energy devices, such as batteries or battery modules, is also disclosed.

Battery is a key component in an electric vehicle (EV). The battery installed in EV is typically a large battery pack to deliver high energy for EV use. It often takes a relatively long time to charge a large battery pack, unless a high-power charging system is available to reduce the charging time. However, the high-power charging system may not be available in most places. A method to address the battery charging issue for EV is also addressed when a high-intensity charging system is not available.

A plurality of energy devices can be grouped in a battery pack for EV use. To manage the charging and discharging of the plurality of energy devices, a plurality of control switches coupled to the plurality of energy devices can be chosen, where the control switch may be a charging control switch, a discharging control switch, a dual-operation control switch, or a charging and discharging combined control switch. The plurality of control switches may be linked in series to form a sequential charging control chain, a sequential discharging control chain, or a charging and discharging combined sequential control chain to control the charging and/or discharging of the plurality of energy devices. A control switch deposed in a front position of the control chain has a higher priority than the control switch deposed in a rear position of the control chain.

In an embodiment, both the charging control switch and the discharging control switch include a 1:2 de-multiplexer. The 1:2 demultiplexer is named as demultiplexer hereafter. The demultiplexer plays a pivot role in the control switch. The demultiplexer comprises a demultiplexer input connected to an enable input signal to the control switch. The demultiplexer is controlled by a select control signal derived from the output of a comparator, which is adapted to compare an attenuated voltage derived from an energy device coupled to the control switch with a reference voltage to generate the comparator output. The demultiplexer also comprises two outputs, where one of the outputs, namely a positivity output, is generated by ANDing the demultiplexer input with the select control signal, and the other one of the demultiplexer outputs, namely a negativity output, is generated by ANDing the demultiplexer input with an inverse or an inverting function of the select control signal. In an embodiment, the switching timing of two demultiplexer outputs can be adjusted, so that the deactivation of the transfer device in the control switch and the activation of the transfer device in a subsequent control switch in the linked control chain can be manipulated to take place in any order when the select control signal to demultiplexer changes state.

In an embodiment, a direct wiring interconnect, a buffer, an even number of inverters, a delay line, or a programmable delay line may be included between the select control signal input to the demultiplexer and the positivity output to delay the assertion of the positivity output. An open drain inverter, an inverting buffer, an odd number of inverters, an inverting delay line or an inverting programmable delay line may be used as the inverting function to delay the asserting of negativity output. By manipulating the delay timing in the assertion of the positivity output and the negativity output, various applications in concurrent, make-before-break or break-before-make power multiplexing are readily achievable. The concurrent switching minimizes power glitches in the power multiplexing.

In an embodiment, one of the two demultiplexer outputs is coupled to the transfer device in the control switch, and the other one of the demultiplexer outputs is coupled to an enable output signal to enable a subsequent control switch. Both the positivity output and the negativity output are negated when the enable input signal to the control switch, so is to the input of the demultiplexer, is disabled. When the enable input signal to the control switch is enabled, one of the two demultiplexer outputs is enabled. The demultiplexer controls the switching between the control switch and the subsequent control switch based on the energy status monitored by a comparator device in the control switch. There is no need for a subsequent control switch to monitor power status in a prior control switch, except that the prior control switch simply issues an enable signal to the subsequent control switch to proceed power multiplexing as well as to control timing for a concurrent, a break-before-make or a make-before-break switching.

In an embodiment, the select control signal to the demultiplexer may be generated by ANDing the derived comparator output with qualifiers on the abnormality detection status, such as insufficient energy or over-voltage being monitored at the power input port of the control switch, over-temperature, over-current, and short-circuit being detected by the control switch, and assertion of an external INHIBIT control signal to the control switch, and so on. Any abnormality being detected de-activates the transfer device in the control switch and asserts the enable output signal to the subsequent control switch.

In an embodiment, the control switch can be portioned into the control section and the transfer section, where the control section comprises the demultiplexer and its control logic and abnormality detection circuits for the generation of the select control signal to the demultiplexer. The transfer section comprises the power input port, the transfer device, the control signal to activate the transfer device and the power output port. By separating the transfer section from the control switch enables the selection of different transfer devices to meet different power requirements.

In an embodiment, the plurality of the control switches may be linked into a sequential control chain by coupling the enable output signal of a prior control switch to the enable input signal of a subsequent control switch. For the control switch in the sequential control chain, with a proper connection of the power input port to an external DC power source or to an energy store device, and the connection of power output port to an energy store device or for external use, the sequential control chain can be configured as a sequential charging control chain or as a sequential discharging control chain.

In an embodiment, the sequential control chain may be portioned into multiple sub-control chains, where an associated enable input signal is coupled to the first control switch for each sub-control chain to enable operation of the sub-control chains in parallel, when the associated enable input signal to the sub-control chain is asserted. Different DC power may be coupled to different sub-control chains, which is useful for a power system having multiple external power sources available for power charging operation.

In an embodiment, a parallel control signal may be ORed with the enable input signal of each control switch linked in a control chain to empower a parallel charging or a parallel discharging operation for the control switches in the sequential control chain. The selection of a sequential or a parallel charging operation may be determined by the availability DC power source and the energy status of the set of battery modules coupled to the control chain. The control chain proceeds charging and/or discharging control automatically without an external micro-controller to control the charging and discharging sequence once the control chain is activated.

In an embodiment, a protection switch may be coupled at the output of the energy store device or battery module, where the protection switch is normally-open when the control chain is disabled, which prevents energy leakage from the battery module. The protection switch is closed to enable both input and output of energy from the battery module.

In an embodiment, a sequential charging control chain and a sequential discharging control chain can be coupled to the same set of battery modules to conduct a sequential charging, a sequential discharging, or a sequential concurrent charging and discharging for a set of battery modules coupled to both control chains in a power system when enabled.

In an embodiment, the comparator output of the control switch may be XORed or XNORed with an external control signal CHARGE, which is input to the control switch to generate a select control signal. The control switch including an XOR gate in deriving the control for the select control signal is named as an XOR control switch hereafter. By inputting a high to the XOR gate, i.e. a high at the CHARGE signal, the XOR control switch can be configured to function as a charging control switch. In addition, by inputting a low to the XOR gate, the XOR control switch can be configured to function as a discharging control switch. The XOR signal can also be used to by-pass or to switch-off the enable of the transfer device in an XOR control switch and to assert an output enable signal to a subsequent control switch during power transfer, when the enable input signal to the XOR control switch is enabled.

If the inverse of the external control signal CHARGE, namely a DISCHARGE control signal, is chosen as input to the XOR control switch, then the XOR gate will be converted to an XNOR gate to form an XNOR control switch. The XOR control switch or the XNOR control switch can be configured as a charging or a discharging control switch by simply changing the polarity of the external control signal CHARGE or DISCHARGE.

In an embodiment, a charging control switch and a discharging control switch can be combined to form a combined charging and discharging control switch, where a single comparator is used to generate a comparison output to derive the select control signal for both charging and discharging operations. Two 2:1 demultiplexers are included in the combined control switch, where one is for controlling the charging operation and the other is for controlling the discharging operation.

In an embodiment, an OR function with a second enable input signal at its input may be coupled to the enable input signal to the charging demultiplexer to enable parallel charging for the combined control switch, so is an additional OR function with a separate enable input signal coupled to the enable input signal to the discharging demultiplexer to enable parallel discharging for the combined control switch.

In an embodiment, when a plurality of combined control switches are linked to form a combined control chain, it can concurrently proceed charging and discharging for a plurality of battery modules coupled to the control chain. The concurrent charging and discharging operations at the combined control chain proceed on different battery modules, with the discharging operation takes precedent over the charging operation if both operations collide. That is when a battery module coupled to combined control chain being discharged, it will not be charged at the same time.

In an embodiment, a single transfer device is adopted for the combined control switch. The transfer device may be separate from the control section as an external device to provide more flexibility in power transfer for both charging and discharging operations. The transfer device may be integrated in the combined control switch, where a separate 2:1 multiplexer is required to select the power input to the transfer device in the combined control switch either from an external DC power source or from an energy device coupled to the combined control switch, so is an additional 1:2 selector to select energy output from the transfer device either to output to the energy device during the charging operation or to output for external use the during discharging operation.

The power switching may take place between two control switches that are not next to each other in the control chain with a timing skew of about one AND gate per stage. The power multiplexing may skip multiple control switches in the control chain to activate a control switch which meets the switching condition. Some variations in the control switch and the control chain will be depicted in detail.

In an embodiment, the charging, discharging, dual charging or discharging, and the combined charging and discharging control switch may be implemented as integrated circuits, or using discrete devices. They can be embedded in a power system for power multiplexing control. The transfer device and the control section in the control switch may be implemented as two integrated circuits so that different transfer device can be chosen for use in different power rating.

DETAIL DESCRIPTIONS

Figure 1A:
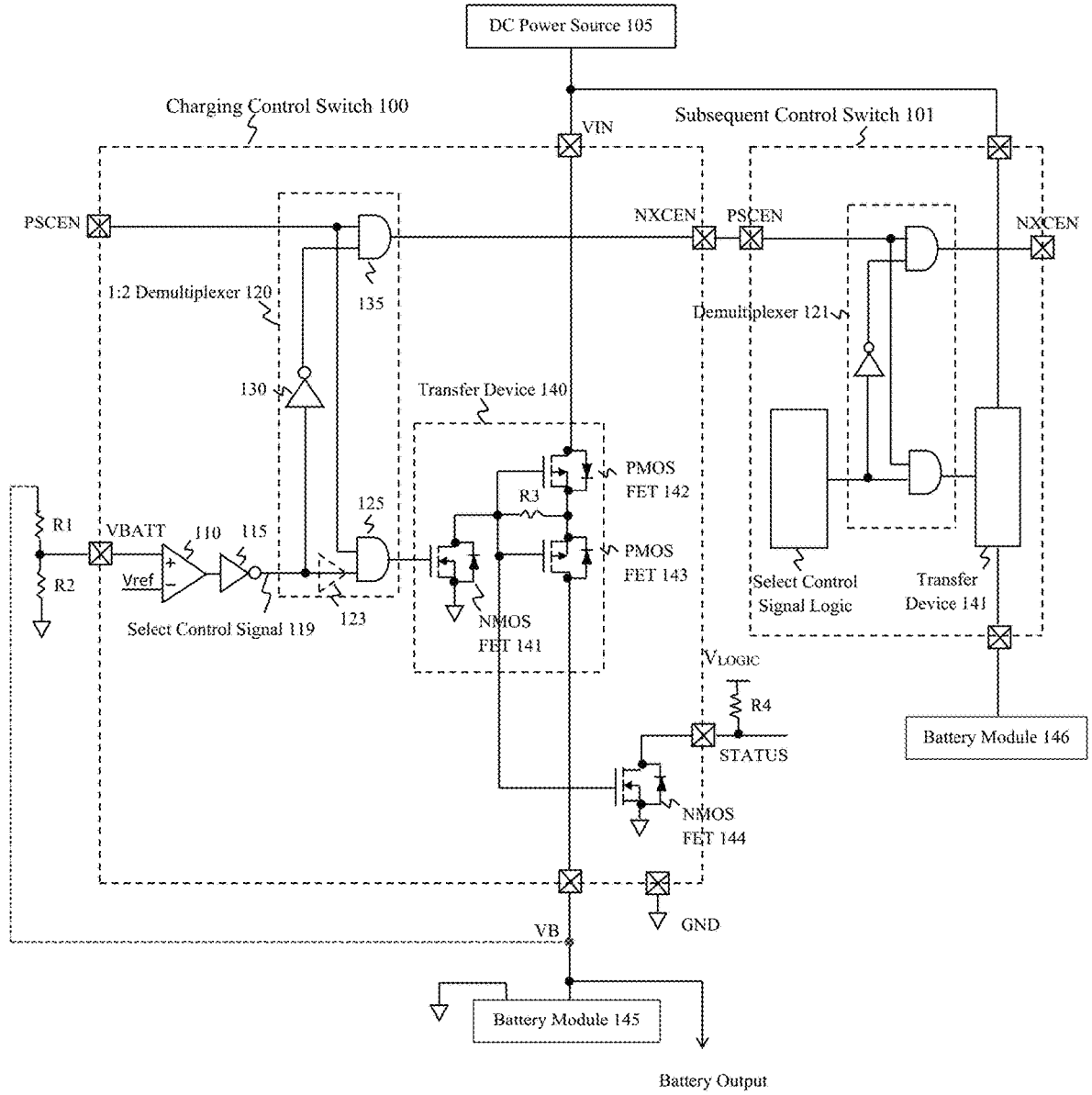
FIG. 1A is a basic configuration of a sequential charging control switch, in accordance with one embodiment of the present disclosure.

There are advantages in partitioning the entire battery pack in an EV into a number of smaller removable batteries, referred to herein alternatively as battery modules or removable battery modules, to gain flexibility to control the charging and discharging of battery either on the battery pack as a whole or on the battery modules, depending upon the availability of power resources.

One advantage in partitioning the entire battery pack into a number of smaller removable battery modules is that the battery capacity in an EV becomes scalable. Depending upon the driving need, a suitable number of battery modules may be installed in the vehicle to optimize cost and energy use, rather than having a large battery pack in the vehicle all the time, which not only is more expensive to own, but also may not be energy efficient to carry a large pack of battery when driving around. A large battery pack may not be necessary for a short commuter.

Also, adapting the battery modules in an EV may provide drivers with another advantage, namely the flexibility to replace the depleted battery modules in a service station, or simply to charge a few depleted battery modules in a shorter time to get sufficient energy to reach destination, where the driver may then fully charge the entire battery pack. If a charging service is unavailable in a remote area, the EV driver may carry a few spare battery modules for replacement purposes. If there are spare battery modules, the spare battery modules may be charged at home station while the EV is being driven outside. The depleted battery modules may be replaced right away when the EV returns to the home station, so that the EV would be ready for driving again after replacing the depleted battery modules without a wait time to charge the battery pack. This may be useful for driving or delivery service companies.

Fast charging a relatively large battery pack, often requires a relatively more powerful charger which may not be available in most places, such as home. Using a level-1 or level-2 charger for charging a battery pack, takes longer time. For example, a 120V 20 A AC level-1 charger may top out at about 2.4 KW and a 240V 40 A AC level-2 charger may top out at about 9.6 KW. It would take hours or even a day to charge up a battery pack of 50 KWh capacity with such chargers. However, if a battery pack is partitioned into multiple removable battery modules, it would take a shorter time to charge up a certain number of battery modules that are sufficient for driving, compared with charging up an entire battery pack.

Energy harvesting is an emerging technology for EV. Although installing solar panel on EV surface may provide less power than a level-1 or level-2 charger, it may be suitable to charge a battery module having a smaller energy capacity. By observing the energy status of the battery modules, the EV driver could perceive to manage the EV battery charging with more flexibility.

When the battery pack in an EV is organized as a set of removable batteries, a method to manage the charging and discharging of the batteries in the battery pack automatically and without using an external microcontroller is desirable. A battery is alternatively referred to herein as a battery module or an energy device. There are many variations in control switches, which may be referred to as load switches, power multiplexers, power sequencers, or power switches, depending upon the applications. For example, some applications use power multiplexing to provide different voltages to power a single load under different cases for power saving or for legacy support concerns. Some power multiplexing is between a main power rail and a backup power rail at same voltage to provide a consistent power for use.

Partitioning a large battery pack in an EV into a set of smaller batteries or battery modules enables the charging and discharging of batteries in the battery pack to proceed on a per module basis. FIG. 1A is an exemplary schematic diagram of a control switch 100 for power charging control, in accordance with one embodiment of the present disclosure. The control switch 100 may be linked to other control switches in a serial fashion to form a sequential control chain. An energy storage device, i.e., a battery or a battery module, could be coupled to a control switch in the sequential control chain. In an embodiment, the charging control switch 100 may comprise, in part, three basic elements, i.e., a voltage comparison device or comparator 110, a 1:2 demultiplexer 120, and a power transfer device 140. The power transfer device may be composed of a set of MOSFETS or bipolar transistors. The voltage comparator 110 compares an attenuated voltage VBATT, coupled to the battery module 145 derived by the voltage divider resistors R1 and R2, with a reference voltage Vref to generate comparator 110's output. The comparator output is saturated to a logic high when there is sufficient energy in the battery module 145. Positive logic is selected for the comparator output in most of the examples described herein, unless specified otherwise. It is understood that by reversing the order of comparator inputs, the comparator output changes state, in which case inverter 115 may be eliminated. The 1:2 demultiplexer is referred to herein alternatively as a demultiplexer. The enable input signal PSCEN, namely a Prior Sequential Charging Enable signal, input to the control switch 100 is also an input to demultiplexer 120. The enable output signal NXCEN, namely Next Charging Enable, which is an output from the control switch 100 and is also an output from the demultiplexer. The interface signal transferred through the control switch from the PSCEN input to the NXCEN output is only one AND gate delay.

The demultiplexer 120 has a select control signal 119, which is derived from the output of comparator 110. In the example shown in FIG. 1, the select control signal 119 of the demultiplexer 120 is the output of comparator 110 being inverted by inverter 115. The demultiplexer 120 has two outputs. One output of demultiplexer 120 is derived by ANDing the select control signal 119 with the demultiplexer input via AND gate 125, which is referred to as a "positivity output" hereinafter. The other output of demultiplexer 120 is derived by ANDing an inverse of the select control signal 119 by inverter 130 with the demultiplexer input via AND gate 135, which is referred to as a "negativity" output hereinafter. Either the positivity output or the negativity output may be coupled to the transfer device 140 in control switch 100. In the example shown in FIG. 1, the positivity output is coupled to the transfer device 140 and the negativity output is coupled to the enable output signal NXCEN.

In control switch 100, when the enable input signal PSCEN is asserted and when energy in the battery module 145 is below a threshold voltage, the comparator 110's output saturates to a logic low. The inversion of comparator output being a logic high value to the select control signal of demultiplexer 120 will assert the positivity output to enable the transfer device 140 to transfer energy from the external DC power source 105 to charge battery module 145. In the meantime, the negativity output is negated to disable the NXCEN output from control switch 100, which is also an enable input PSCEN to a subsequent control switch 101.

If the delay from the select control signal 119 in control switch 100 through the negativity output to enable a transfer device 141 in a subsequent (also referred to herein as successor) control switch 101 is longer than the delay to negate the positivity output at control switch 100, then a break-before-make power multiplexing takes place at the rise of the select control signal 119, i.e., when the battery module 145 becomes fully charged.

The configuration of the demultiplexer is especially resilient in power multiplexing control. For example, if a delay device or delay buffer 123 is included between the select control signal 119 and the AND gate 125 in control switch 100 to adjust the timing to negate the positivity output so that the turn-off of transfer device 140 in control switch 100 matches the turn-on of the transfer device 141 in subsequent control switch 101 almost at the same time, then a concurrent switching is achieved. However, if the delay of the delay buffer 123 is further extended, then a break-before-make power switching can also be readily achievable at the rise of the select control signal 119. The delay buffer 123 may be a wire connection, a buffer, an even number of inverters coupled in series, a delay line, a programmable delay line, and the like. The delay buffer 123 may be coupled along the timing path of the positivity output signal from the select control signal 119 to the input to transfer device 140.

In an embodiment, the power multiplexing between the control switch 100 and a subsequent control switch 101 is completely under the control of a front control switch 100, which means the subsequent control switch 101 does not need to query the voltage level or the power status at the front control switch 100 in order to switch the power control over. The front control switch 100 simply adopts a single enable output signal to control both switching and switching timing in a power multiplexing.

The negation of signal PSCEN negates the control switch 100 and all subsequent control switches linked to the control switch 100 in a control chain. When the signal PSCEN input is asserted, and when the battery module 145 has sufficient energy, the comparator 110 will saturate to a logic high level. The output of inverter 115 becomes a logic low to deactivate transfer device 140 in control switch 100, thereby disconnecting DC power source 105 from charging the battery module 145. In the meantime, the logic-low output at the inverter 115 will assert the NXCEN enable output signal, thereby activating the transfer device 141 in a subsequent control switch 101 to charge its associated battery module 146.

If the battery module 145 does not have sufficient energy, the comparator 110's output saturates to a logic low. The inverted output of comparator 110 to logic high by inverter 115 will activate the transfer device 140 in control switch 100 to transfer DC power source 105 to charge battery module 145. In the meantime, the NXCEN output signal will be negated so that the transfer device 141 in any subsequent control switch 101 is inactivated and thus inhibited from charging its associated battery module 146.

The transfer device 140 in FIG. 1A uses a pair of PMOS-FET (PMOS) 142, 143 transfer gates to control power transfer. The body diodes in the pair of PMOS 142, 143 block the reverse current from power output pin VB and leakage current from the DC power source 105. The body diode in PMOS 142 also provides a pull-up power for NMOS-FET (NMOS) 141, which is pulled-down to drive the pair of active low PMOS 142, 143 when the output of AND 125 is asserted. The open drain STATUS output is pulled-up by an external resistor R4 and is driven by NMOS 144. The STATUS output is asserted when transfer device 140 is activated to charge battery module 145.

Figure 1B:
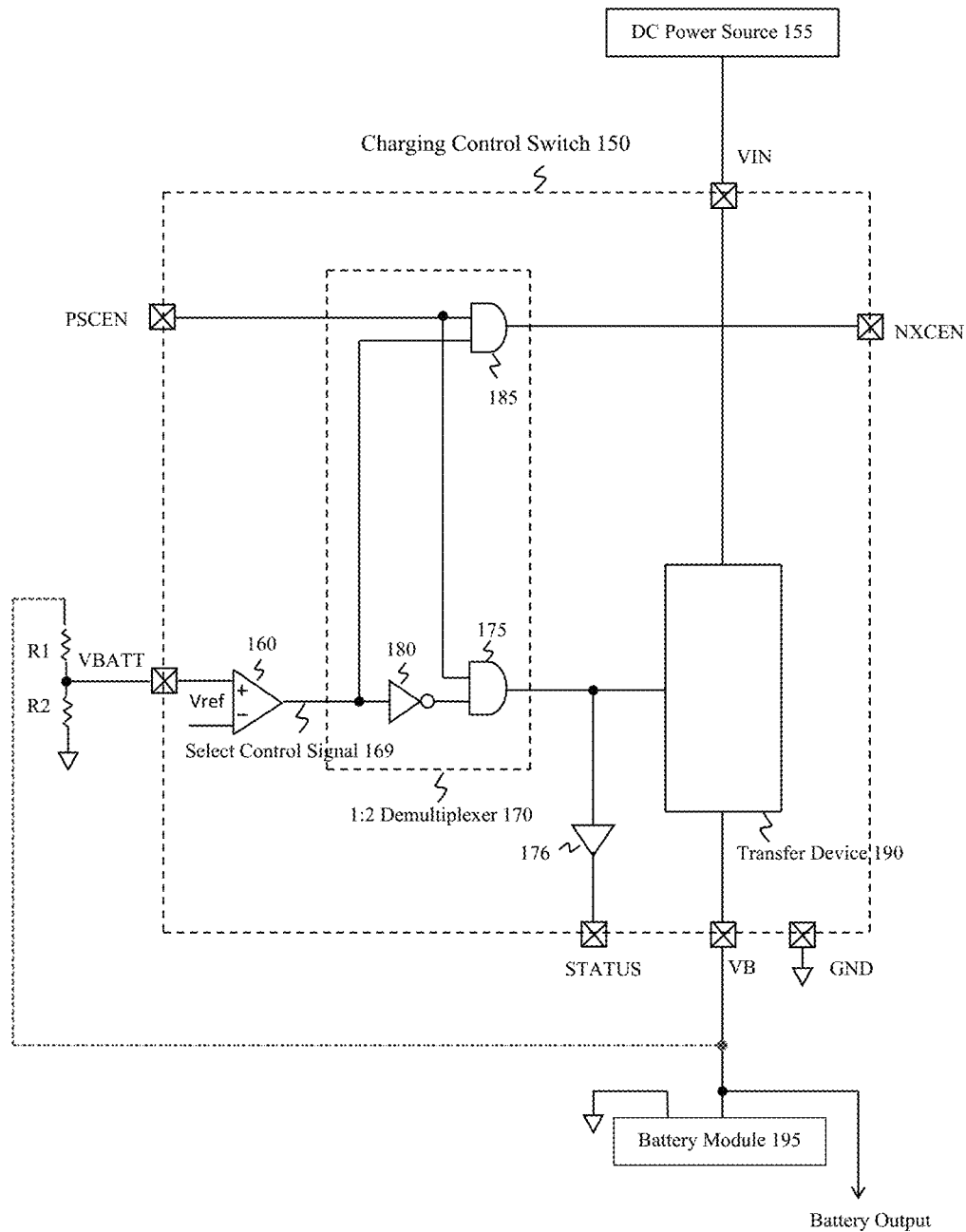
FIG. 1B illustrates an alternative configuration of a sequential charging control switch, in accordance with one embodiment of the present disclosure.

FIG. 1B is another configuration of a sequential charging control switch 150, in accordance with an embodiment of the present disclosure. The transfer device 190 in control switch 150 is coupled to the negativity output in the example. Instead of using an inverted comparator output as the select control signal as shown in FIG. 1A, the comparator 160 output is directly used as the select control signal 169 in control switch 150. In FIG. 1B, the negativity output is coupled to the transfer device 190 in control switch 150, and the positivity output controls the NXCEN signal.

If an inverse of the comparator 160's output is used as the select control signal in control switch 150, the positivity output shall be converted to the negativity output and the negativity output shall be converted to the positivity output without altering the functionality of the control switch, except that the characteristic of output timing is different. One advantage of demultiplexer 170 in control switch 150 is that by adjusting the device size of inverter 180, it may balance the switching timing of the transfer devices in the control switch 150 and in a subsequent control switch.

In an embodiment, in the demultiplexer 170 when the inverter 180 coupled to the negativity output (at AND gate 175) is replaced by an inverse delay device, such as an inverting delay buffer, an odd number of inverters in series, a fixed or a programmable delay line with inverted output, to extend the assertion timing of negativity output at AND gate 175, so that different types of switching, such as concurrently, break-before-make, or make-before-break power multiplexing is readily achievable by simply adjusting the delay timing at the negativity output, regardless of the transfer gate is being connected to the positivity output or to the negativity output. Similarly, a delay device may be incorporated at the positivity output path to adjust the positivity output timing for various power multiplexes. The inverse delay device or the delay device may be within the demultiplex or may be incorporated at the output path of the negativity output or the positivity output in the control switch respectively.

Figure 2A:
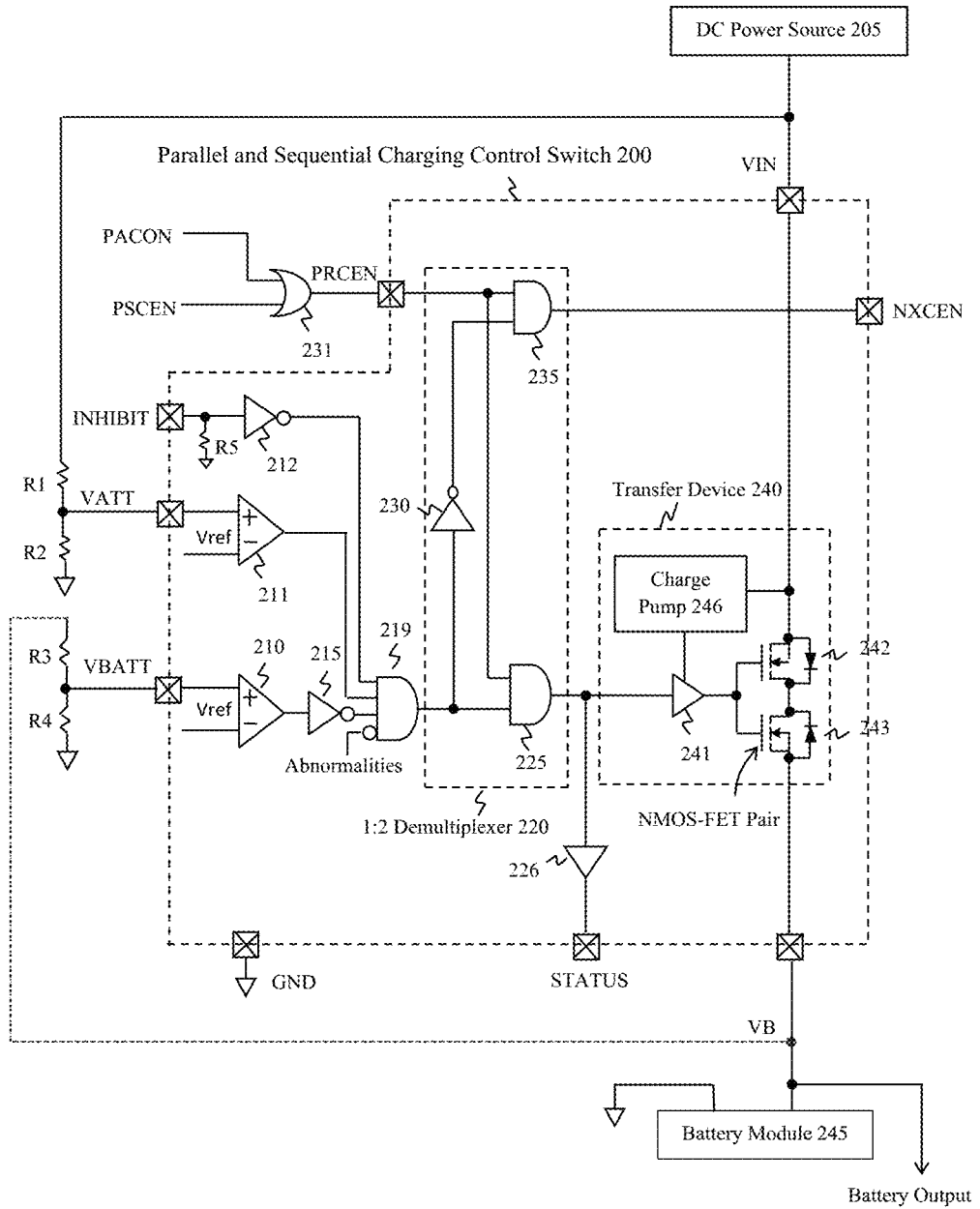
FIG. 2A is an exemplary control switch for parallel and sequential charging control, in accordance with one embodiment of the present disclosure.

FIG. 2A illustrates an exemplary sequential charging control switch 200, in accordance with another embodiment of the present disclosure. A parallel charging control is included in the control switch 200 as an optional feature. A parallel charging can charge more battery modules concurrently when a larger power source is available, such as a level-3 charger. Whereas sequential charging, which charges battery module one at a time, may be more suitable for connecting to a smaller power source. To support both parallel and sequential charging, an OR gate 231 receives a first enable input "Parallel Charging ON" (PACON), and a second enable input "Prior Sequential Charging Enable" PSCEN, to generate a new enable input "Prior Charging Enable" PRCEN, for control switch 200. The PRCEN signal shown becomes an input to the 1:2 demultiplexer 220. The OR gate 231 may be included in the control switch 200, or an external add-on device to the control switch.

Either the assertion of PSCEN or the assertion of PACON could enable demultiplexer 220 in control switch 200 to activate transfer device 240 to transfer a DC power source 205 to charge battery module 245, provided that the energy in the battery module 245 being detected by the comparator 210 is at a low level, and that the DC power source 205 being detected by the comparator 211 has sufficient energy in it. The comparator 210 monitors an attenuated voltage VBATT from battery module 245, derived by voltage divider R3, R4, and the comparator 211 monitors an attenuated voltage VATT of DC power source 205, derived by voltage divider R1, R2.

In control switch 200, besides monitoring energy status of battery module 245 by comparator 210 output, the select control signal to demultiplexer 220 is derived by ANDing enable qualifiers with AND gate 219 which performs a Boolean AND of, in part, the energy status of DC power source 205 and the detected status on abnormalities, such as overvoltage and over current at power input, device junction over-temperature, short circuit, plus an optional inhibit control INHIBIT, which is useful for external device to temporarily disable control switch 200. The assertion of abnormalities will cause the demultiplexer 220 to deactivate the transfer device 240 and assert the NXCEN signal to enable a subsequent control switch.

The transfer device 240 in control switch 200 uses a pair of NMOS field-effect transistors 242, 243 to control power transfer. The gate voltage of a NMOS transistor shall be higher than its source voltage for the transistor to operate in a conductive region. A charge pump 246 which sources VIN from the DC power source 205 boosts the output voltage of driver 241 to turn on NMOS transistors for power transfer when the transfer device 240 is activated.

Figure 2B:
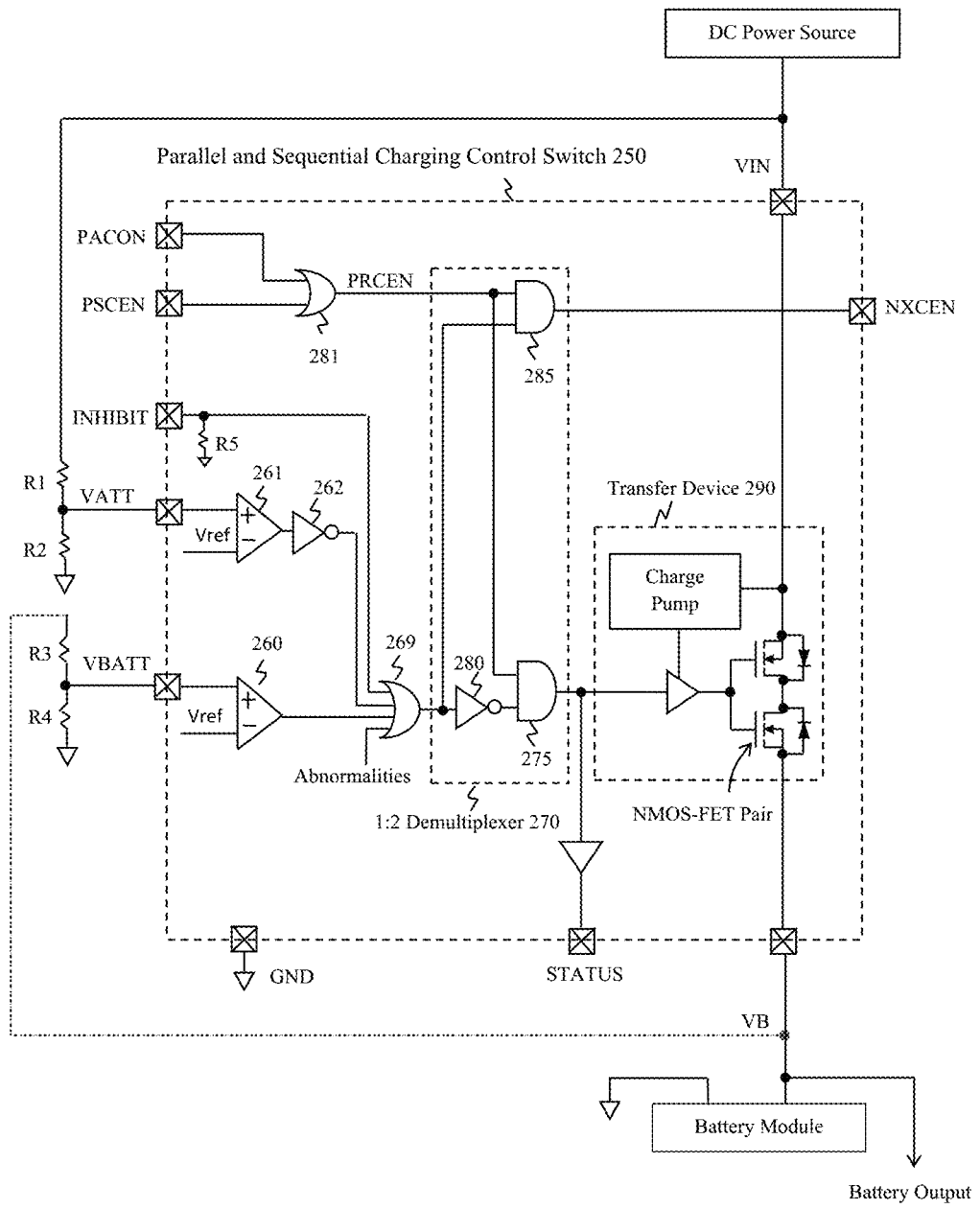
FIG. 2B illustrates another exemplary control switch for parallel and sequential charging control, in accordance with one embodiment of the present disclosure.

It is flexible to couple the transfer device in the control switch to the positivity output or the negativity output as long as the polarity of the select control signal can be changed accordingly. The control switch 250 in FIG. 2B, which is otherwise similar to control switch 200 of FIG. 2A, shows such an example. When the negativity output is chosen to activate the transfer device 290 in demultiplexer 270, the polarity of the select control signal is inverted from AND 219 to a NAND function. A Boolean equivalence shown in FIG. 2B converts the NAND function into an OR 269, where all inputs to OR 269 are inverted accordingly. The converted OR 269 output becomes the select control signal to demultiplexer 270.

Figure 3A:
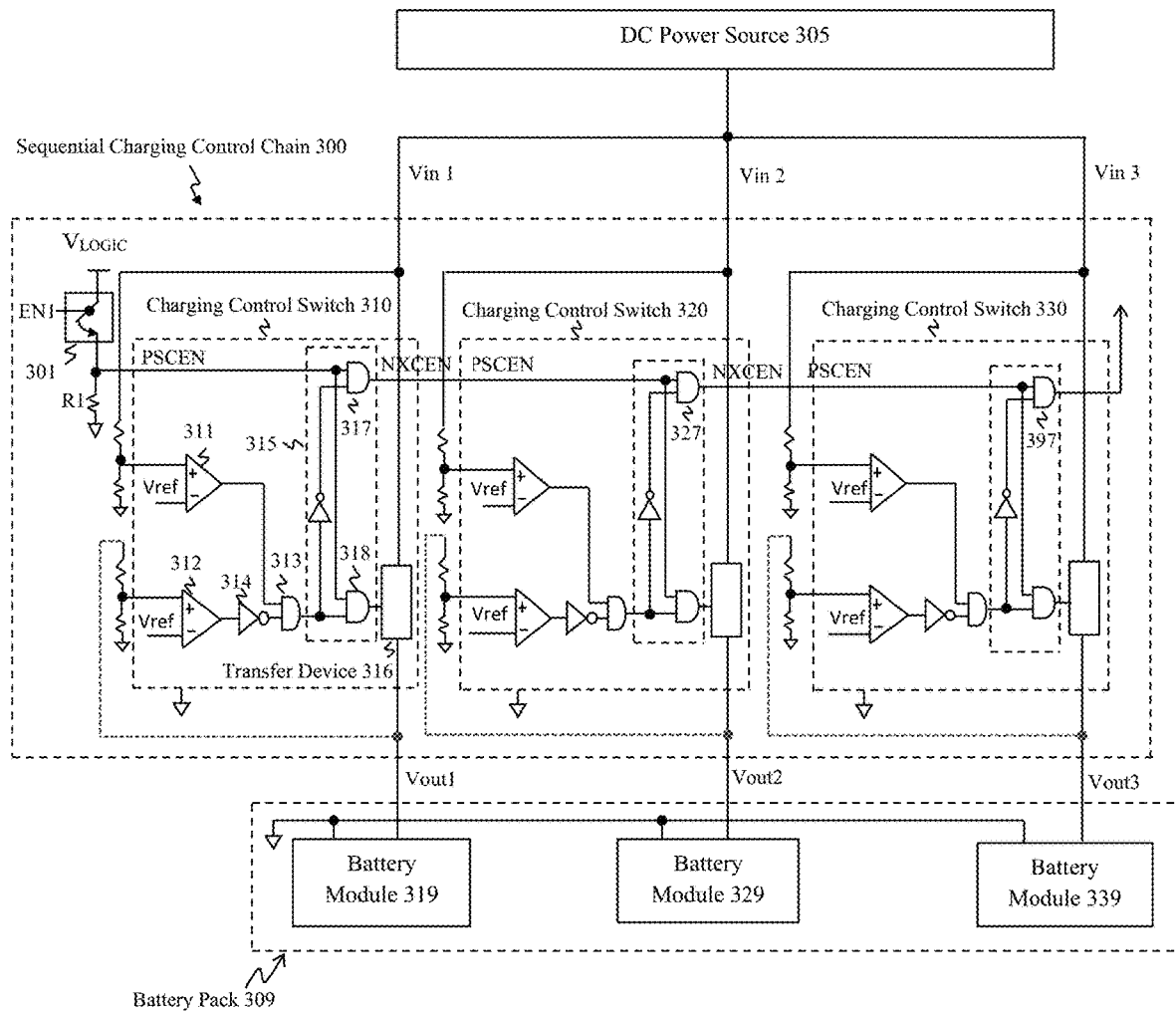
FIG. 3A illustrates an exemplary sequential charging control chain for a set of battery modules, in accordance with one embodiment of the present disclosure.

FIG. 3A illustrates an exemplary sequential charging control chain which links a set of charging control switches in series, in accordance with another embodiment. Although only three control switches 310, 320, 330 are shown in the example, it is understood that more control switches may be linked in a control chain. In the example shown in FIG. 3A, a key switch 301 controls the activation of the control chain 300. When key switch 301 is open, the pull-down resistor R1 disables the entire control chain 300. When the key switch 301 is closed, a logic high $V_{LOGIC}$ output from key switch 301 asserts an enable input signal PSCEN to the first control switch 310, which also activates the control chain 300. The control switch 310 monitors the energy status at DC power source 305 with comparator 311, and the energy status in battery module 319 with comparator 312. Both comparison results are coupled to AND gate 313 in the example to generate the select control signal for the demultiplexer 315. Either the positivity output or the negativity output may be chosen to activate the transfer device. In control switch 310, the positivity output is chosen. An inverter 314 is required to invert the comparator 312 output for the charging application. When energy in battery module 319 is below a threshold voltage, the comparator 312 output saturates to a logic low. As the transfer device 318 in the example of FIG. 3 is coupled to positivity output, it requires a logic high at the select control signal to assert the positivity output, and inverter 314 inverts the comparator output in such conditions.

When the battery module 319 is charged to reach a threshold level, the comparator 312 output saturates to a logic high and the AND 313 output becomes a logic low. A low logic level signal at the select control signal of demultiplexer 315 asserts signal NXCEN at negativity output, and asserts signal PSCEN, thereby enabling a subsequent control switch 320 and de-activating the transfer device 316 coupled to the positivity output in control switch 310. A similar process will proceed until all control switches 320, 330 in the charging control chain 300 are activated, thus causing all battery modules 319, 329, 339 to be sufficiently charged and disconnected from the DC power source 305.

A linking sequence is formed as described below. The linking sequence as shown in FIG. 3A starts from the PSCEN signal being supplied by key switch 301; the signal PSCEN, in turn is input to AND gate 317 in control switch 310 to generate signal NXCEN, which, in turn, is shown as being the signal PSCEN input to the second control switch 320 and applied to input to AND gate 327 in control switch 320; AND gate 327 generates signal NXCEN for control switch 330, which, in turn, is shown as being the PSCEN input to a third control switch 330, and the like. The linking sequence, as described herein, forms the sequential control chain 300, where a common DC power source 305 charges a set of battery modules 319, 329, 339. The first switch in the chain, namely control switch 310, has a higher priority than control switch 320, and control switch 320 has a higher priority than control switch 330.

An asserted enable control output signal may skip multiple contiguous control switches in the control chain, if energy in the batteries coupled to these control switches happens to be full. The delay in search of a subsequent control switch to activate in a sequential control chain is one AND gate delay per stage.

In some embodiments, when an enable output signal from a higher priority control switch in a control chain is asserted, such as replacing a fully changed battery module with an empty battery module in a battery pack, all subsequent enable output signals starting from that higher priority control switch are negated to activate the higher priority control switch for battery charging, regardless of the number of stages in between.

Figure 3B:
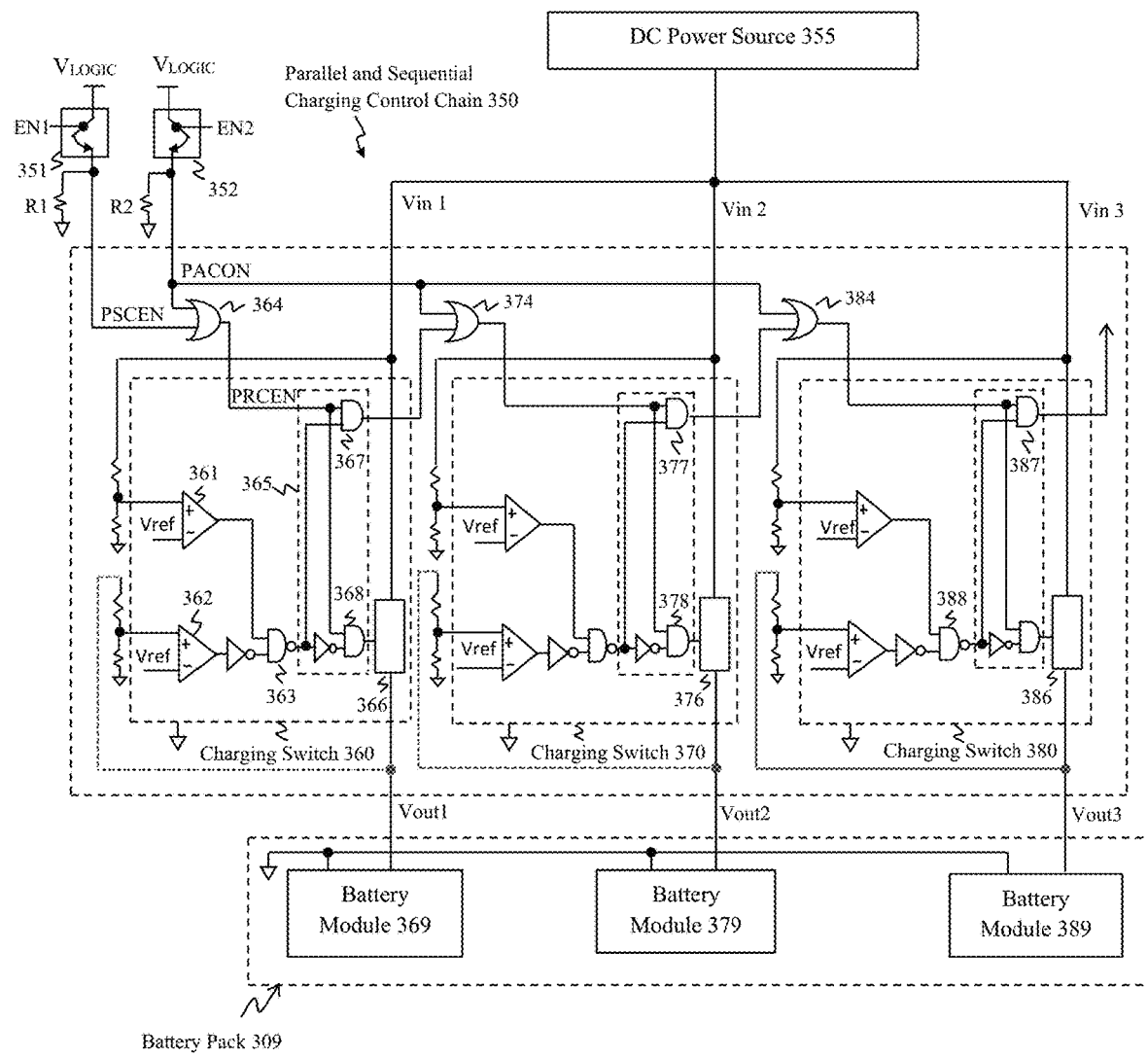
FIG. 3B is an example to incorporate parallel charging function in a sequential charging control chain, in accordance with one embodiment of the present disclosure.

FIG. 3B illustrates an example of an embodiment of a charging control switch 350 that implements parallel control. Embodiment 350 is similar to embodiment 300 except that embodiment 350 includes, in part, an OR gate to OR (i.e., perform a Boolean OR function) a parallel enable signal PACON applied to all control switches 360, 370 and 380. For example, the OR gate 364 associated with charging control switch 360 performs a Boolean OR operation of signal PACON with the serial enables signal PSCEN associated with charging control switch 360 to generate a control signal PRCEN applied to AND gate 367. The output signal of AND gate 367 is applied to an input terminal of OR gate 374 associated with charging control switch 370, and similarly the output signal of AND gate 377 is applied to an input terminal of OR gate 384 associated with charging control switch 380. Accordingly, all control switches in the control chain 350 can be enabled for parallel charging and for sequential charging for all battery modules coupled to the control chain 350. Key switches 302, 303 are adapted to assert the enable signal for sequential charging and parallel charging respectively. Key switch 351 initiates sequential charging and key switch 352 initiates parallel charging. Similarly, when key switch 352 is open, the parallel charging control signal PACON is disabled by the pull-down resistor R2 and the control chain 300 is enabled for sequential charging if the key 351 is closed to assert the signal PSCEN. However, when key switch 352 is closed, the assertion of PACON will cause all outputs at OR gates 364, 374, 384 to assert, thereby to enable all control switches 360, 370, 380, alternatively referred to herein as charging control switches, in the control chain 350 to activate their respective transfer devices 366, 376, 386 to transfer energy from the DC power source 355 to charge their associated battery modules 369, 379, 389 concurrently. When battery modules in the parallel charging control chain are charged, AND gate 368, 378, 388 coupled to their respective negativity outputs to enable transfer device 366, 376, 386, disposed respectively in control switch 360, 370, 380, will be negated to cut off the DC power source 355 from further charging the respective battery module, while the respective enable output signals coupled to their respective positivity outputs generated by AND gate 367, 377, 387 are asserted. However, the assertions of the enable output signals have no impact on parallel charging operation. The ORed outputs from OR gates 364, 374, 384 suppress, respectively, the outputs of AND gates 367, 377, 387, when the parallel charging operation is enabled.

A parallel charging is suitable to charge battery modules when there is a high-intensity power source available for fast charging, such as a level-3 charger. Other charging sources, such as a level-1 or a level-2 charger, may not be energetic enough to timely charge up an entire battery pack. Some emerging technology, such as installing solar panel on car surface or even disposing piezoelectric membranes on air flow path in EV to harvest moving energy could be a viable option, although may not be as intensive. A sequential charging chain is suitable for harvesting such green energy resources, if the battery pack in EV is partitioned into multiple smaller battery modules.

Depending upon the intensity of regenerated energy and the cost consideration, for example, solar panel may use a device that performs pulse width modulation (PWM) at the output of solar panel, which is switched on and off at a specific frequency to generate an output voltage compatible with the voltage rating of battery modules to charge the battery modules linked in a sequential charging control chain. However, when a large solar power system is available for battery charging, the solar panel output may be connected to a more efficient maximum power point tracking (MPPT) device adapted to output a relatively higher voltage and power to charge more batteries at once. Such a large-scale solar panel may activate parallel charging in a charging control chain with parallel charging support when a strong solar power output is available. When the solar panel output becomes relatively weaker, the charging may be automatically switched to sequential charging.

Figure 4A:
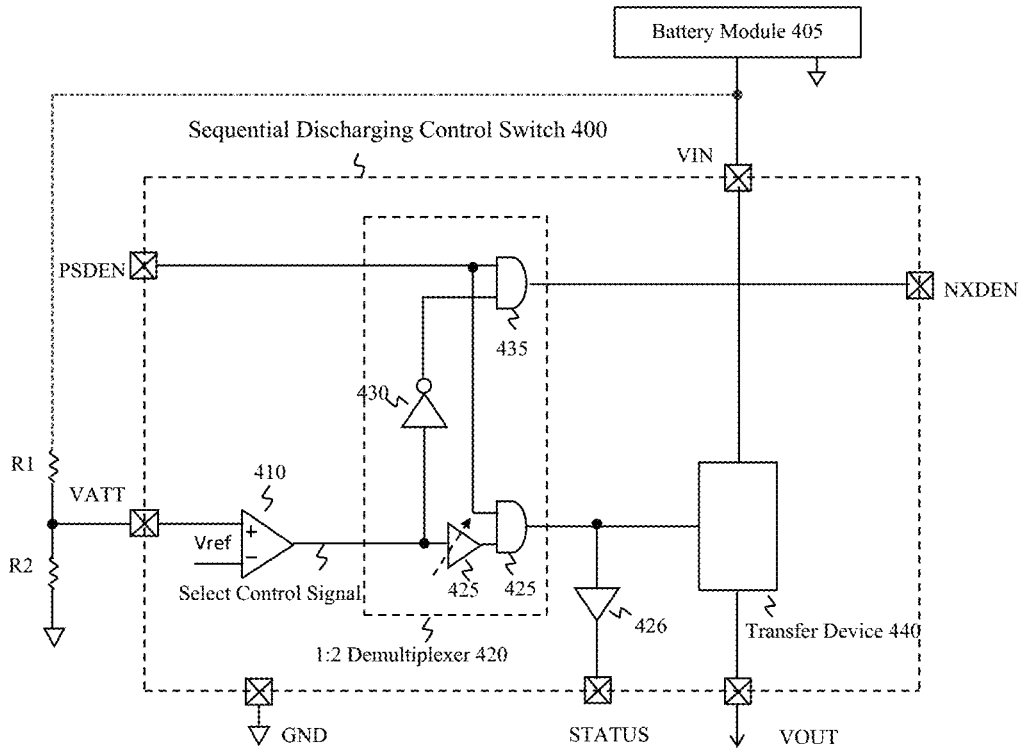
FIG. 4A is a basic configuration of a sequential discharging control switch, in accordance with one embodiment of the present disclosure.

FIG. 4A is a basic schematic configuration of a sequential discharging control switch 400, in accordance with one embodiment of the present disclosure. Switch 400 as shown includes, in part, a voltage comparator 410, a 1:2 demultiplexer 420, and a power transfer device 440. The comparator 410 compares an attenuated voltage VATT derived from voltage divider R1, R2 coupled to battery module 405 to a reference voltage Vref. The output of comparator 410 is used to generate select control signal for demultiplexer 420.

A discharging control switch is similar to a charging control switch, where both monitor the energy status of a coupled battery. However, for a charging control switch, when energy in the coupled battery is detected to be a low level, a charging activity takes place until the battery is charged to a designated level (e.g., 80%, 90%, or 100% as determined by a user) at which point the charging stops. For a discharging control switch, when energy in the coupled battery is detected as a logic high indicating that the battery charge is sufficient, a discharging activity takes place. The discharging activity stops when the energy in the battery reaches a designated level (e.g., 5%, 10%, or 15% as determined by a user). The difference between the two control switches is at the comparator output being saturated to a logic high for the discharging operation, or saturated to a logic low for the charging operation. The transfer device in control switch is activated when charging or discharging takes place.

In control switch 400, the transfer device 440 may be adapted to couple to the positivity output or to the negativity output, depending upon the choice of a proper polarity for the select control signal. Control switch 400 shown in FIG. 4A may further include, in part, a delay buffer 425 coupled to the positivity output at AND gate 425. The delay buffer 425 may be a wiring interconnect, a buffer, an even number of inverters, a delay line, a programmable delay line, and the like. The delay buffer 425 may be included along the timing path of the positivity output signal from the select control signal to the input to transfer device 420. It also includes an inverter 430 at the input to the negativity output at AND gate 435. The inverter 430 may be an odd number of inverters, an inverting buffer, a fixed or a programmable inverting delay line, and the like. Accordingly, the discharging control switch 400 is adapted to perform concurrent, break-before-make, or make-before-break power multiplexing.

Referring to FIG. 4A, when the battery module 405 has sufficient energy, the output of comparator 410 saturates to a logic high level. A high at the comparator 410's output, which is also as the select control signal for demultiplexer 420, asserts the positivity output, thereby to activate transfer device 440 to transfer energy from battery module 405 to VOUT in power discharging, if the enable input signal PSDEN is also asserted.

Conversely, if comparator 410's output saturates to a logic low level, thereby indicating that battery module 405 does not have sufficient energy for output, then a logic low signal at the select control signal of demultiplexer 420 asserts the negativity output; this asserts the enable output signal for a subsequent control switch to activate its transfer device to discharge a coupled battery module to output energy for external use, provided that it has sufficient energy available.

A buffer 426 may be coupled at next to the enable input of transfer device 440 to indicate that power discharging is in progress at control switch 400. If buffer 426 is reconnected to the comparator 410's output, then it would indicate the power status of battery module 405, regardless of any abnormality that may encounter in the control switch 400.

Figure 4B:
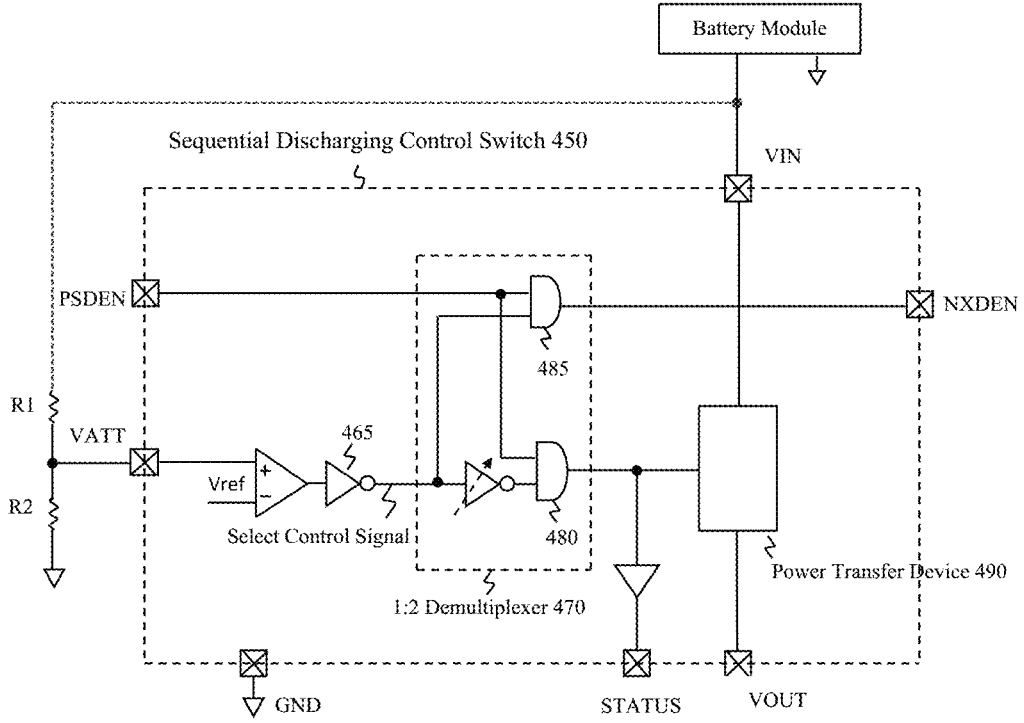
FIG. 4B illustrates an alternative configuration of a sequential discharging control switch, in accordance with one embodiment of the present disclosure.

FIG. 4B is another schematic configuration of a sequential discharging control switch 450, in accordance with another embodiment of the present disclosure. In switch 450, the positivity output and the negativity output, being the outputs of AND gates 485 and 480, coupled to signal NXDEN and transfer device 490 are reversed relative to the negativity and the positivity outputs coupled to signal NXDEN and transfer device 440 in control switch 400. The polarity of the select control signal for demultiplexer 470 of FIG. 4B is inverted by inverter 465 relative to that of demultiplexer 420 of FIG. 4A.

Figure 5:
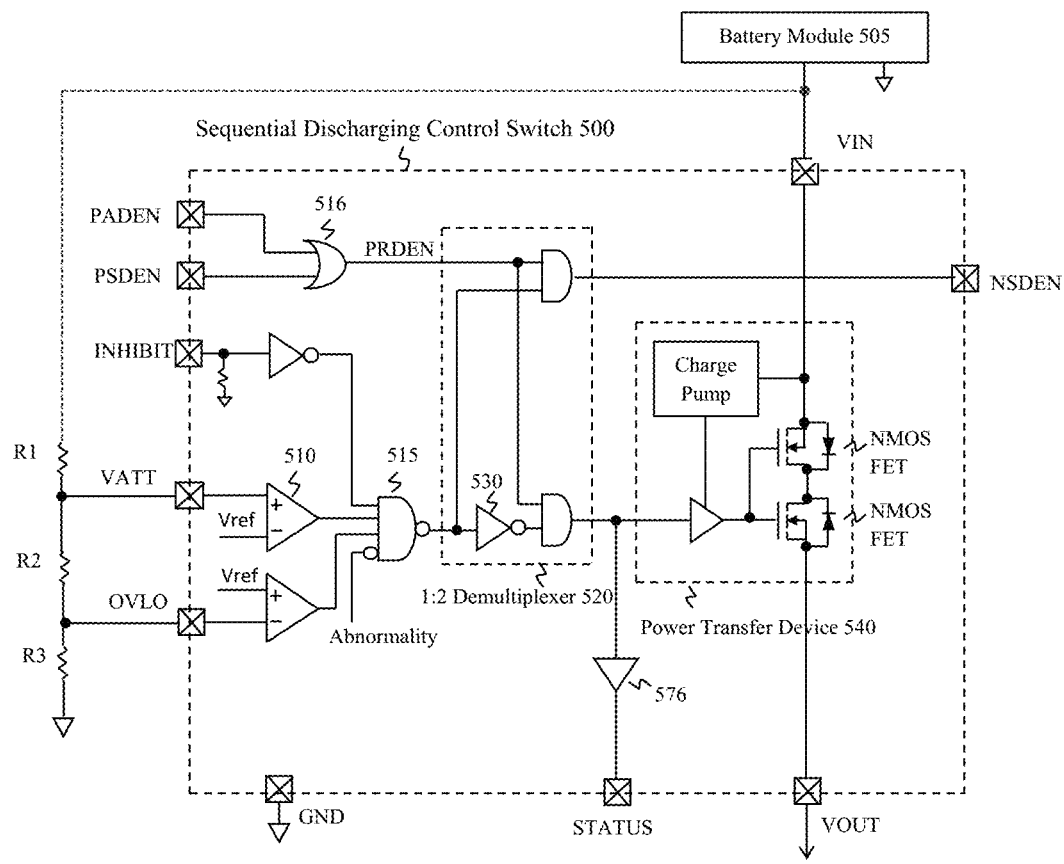
FIG. 5 illustrates an exemplary control switch for parallel and sequential discharging control, in accordance with one embodiment of the present disclosure.

FIG. 5 is a schematic diagram of a parallel and sequential discharging control switch 500, in accordance with another embodiment of the preset disclosure. The parallel and sequential discharging control switch 500 includes qualifier logic to detect operational abnormalities, such as overvoltage and over current at input power, device junction over-temperature, short circuit, and the like. The inverse of detected abnormalities is logically ANDed, via NAND gate 515, with the comparator 510 output to generate the select control signal for demultiplexer 520, where the comparator 510's output monitors the energy status in battery module 505. An optional control signal INHIBIT may be included for an external device to disable the transfer device 540 in control switch 500.

In FIG. 5, if battery module 505 has sufficient energy and no abnormalities come across, the AND function output will be at a logic high, which is implemented by NAND gate 515 so as to output a logic low to assert the negativity output to activate the transfer device 540. In case encountering any abnormality, the select control signal will become a logic high for demultiplexer 520 to deactivate the transfer device 540 and to assert the NXCEN, which causes a subsequent control switch to be activated.

Similarly, a second enable input signal PADEN is included in the control switch 500 to OR with the sequential enable input signal PSDEN by OR gate 516 to generate an input signal PRDEN for input to the demultiplexer 520. Either the assertion of PADEN or the assertion of PSDEN will assert the negativity output to activate transfer device 540 to transfer battery 505 energy for external use when the select control signal at output of NAND 515 is a logic low.

The OR gate 516 may be an internal logic or an external add-on device to control switch 500.

An output buffer 576 may be coupled at the negativity output next to the transfer device 540 for status observation. When the STATUS output is asserted, it indicates the control switch 500 is discharging battery energy through terminal VOUT under a satisfactory discharging condition. The output buffer may be re-positioned to the output of comparator 510 to indicate if the battery module 505 has sufficient energy, and thus for observing the energy status of respective battery module in a battery pack.

Figure 6:
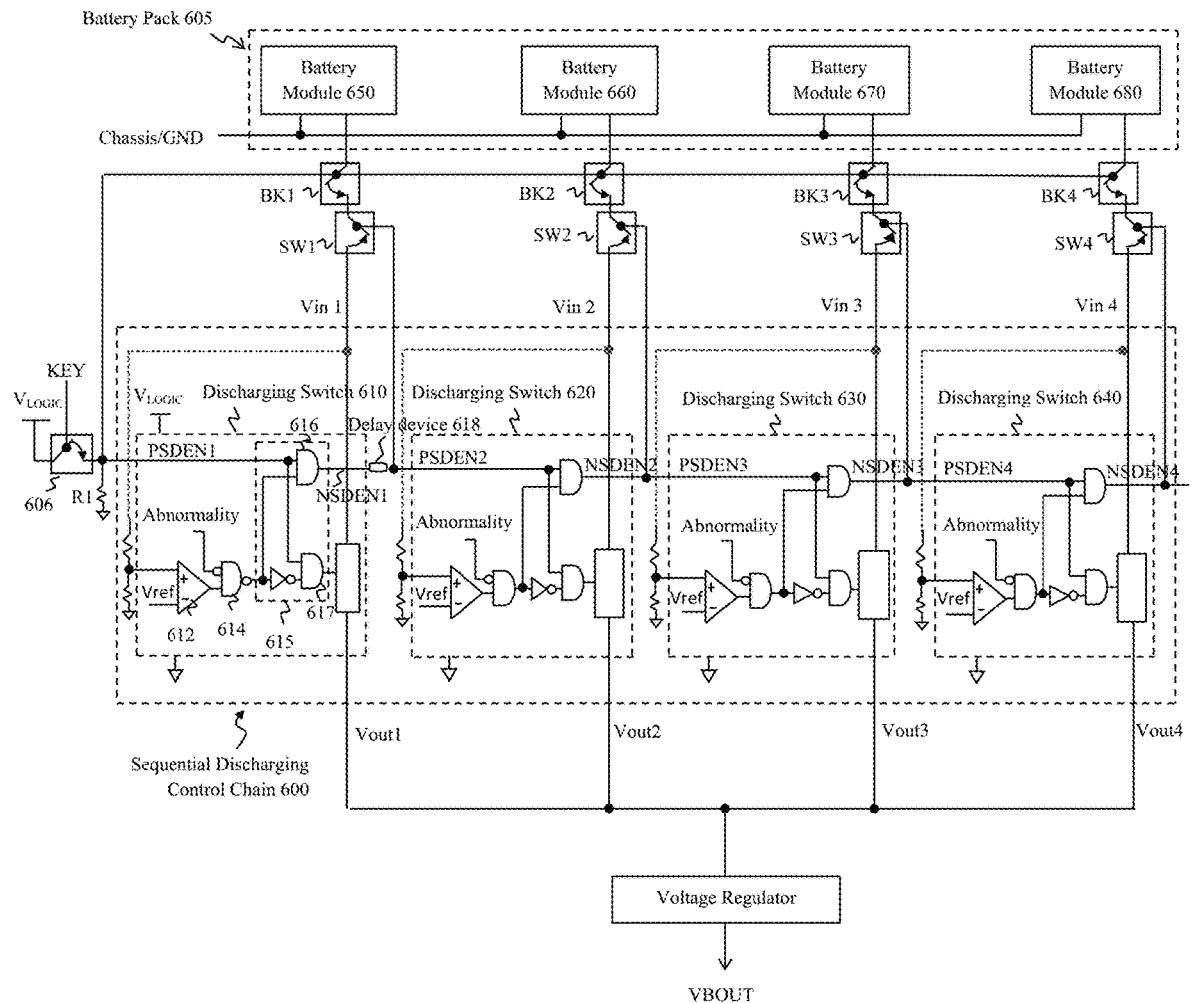
FIG. 6 illustrates an exemplary sequential discharging control chain for a set of battery modules, in accordance with one embodiment of the present disclosure.

FIG. 6 is a schematic diagram of a sequential discharging control chain 600 linking a set of discharging control switches 610, 620, 630, 640 to control sequential discharging for a set of battery modules 650, 660, 670, 680 in a battery pack 605, in accordance with one embodiment of the present disclosure. Although only four discharging control switches 610, 620, 630, 640 are shown, it is understood that any number of discharging control switches may be chained to form a link.

Key switch 606 is used to initiate the discharging operation in control chain 600. Optional switches, $BK_i$ and $SW_i$, where is an index ranging from 1 to 4 in the example shown in FIG. 6, are connected in series for each discharging switch. For example, optional switches $BK_1$ and $SW_1$ are connected to the discharging switch 610 between battery module 650 and the input to the discharging switch 610. Similarly, switches $BK_2$ and $SW_2$ are used in discharging switch 620 between battery module 660 and the input to the discharging switch 620. Switch $BK_i$ is normally open and the $SW_i$ switch is normally closed. When control key switch 606 is open, its pull-down resistor R1 ensures all $BK_i$ switches remain open. When the key switch 606 is closed, a logic high voltage $V_{LOGIC}$ is delivered to enable the sequential discharging control chain 600 and to close all $BK_i$ switches so that battery modules are coupled to their respective discharging control switches in the sequential discharging control chain 600.

Each switch $SW_i$ becomes open when the energy in its respective battery module falls below a designated level. For example, when energy in battery module 650 is depleted to fall below a designated level, signal NSDEN1 will be asserted to open switch $SW_i$, which will disconnect battery module 650 from control switch 610 in order to prevent further depletion of energy in battery module 650. The assertion of signal NSDEN1 also enables a subsequent control switch 620 in control chain 600 to proceed power discharging, provided that its coupled battery module 660 has sufficient energy. Otherwise, a next control switch 630 will be enabled by asserting signal NSDEN2, which will also disconnect the $SW_2$ switch. The operation proceeds automatically and, in the manner described until all battery modules coupled to their associated discharging control switches in the control chain 600 are depleted, at which point all $SW_i$ switches become open again.

A delay element also referred to herein as device 618 may be optionally included at the output of the first control switch 610. Initially all switches $BK_i$ switches are open via pull-down resistors R1 when the control key switch 606 is open. In the exemplary control chain 600, the positivity output at the output of AND gate 616 disposed in control switch 610 is initially at a logic low due to the negation of signal PSDEN1. But when the control key switch 606 is closed, signal PSDEN1 is asserted to enable signal NSDEN1 after an AND gate delay and may open switch $SW_1$ earlier than the assertion of the comparator 612, thereby possibly causing a race condition with the rise of energy in control switch 610, which may, in turn, prevent battery module 650 from sourcing power to control switch 610. To prevent such a race condition, delay device 618 is used at the output of AND 616. The delay associated with delay device 618 is selected to be long enough for the first control switch 610 in the control chain 600 to be fully initialized to prevent switch $SW_1$ from being switched off too early. The race, if not inhibited, may prevent a few battery modules from supplying power. In some embodiment, switches $SW_i$, which are adapted to protect their coupled battery modules from deep depletion when the key switch 606 is kept on for a long time, may not be used in the discharging chain 600. In such embodiments switches $BK_i$ may be maintained to prevent battery modules from deep-depletion when battery pack 605 is keyed off.

Figure 7:
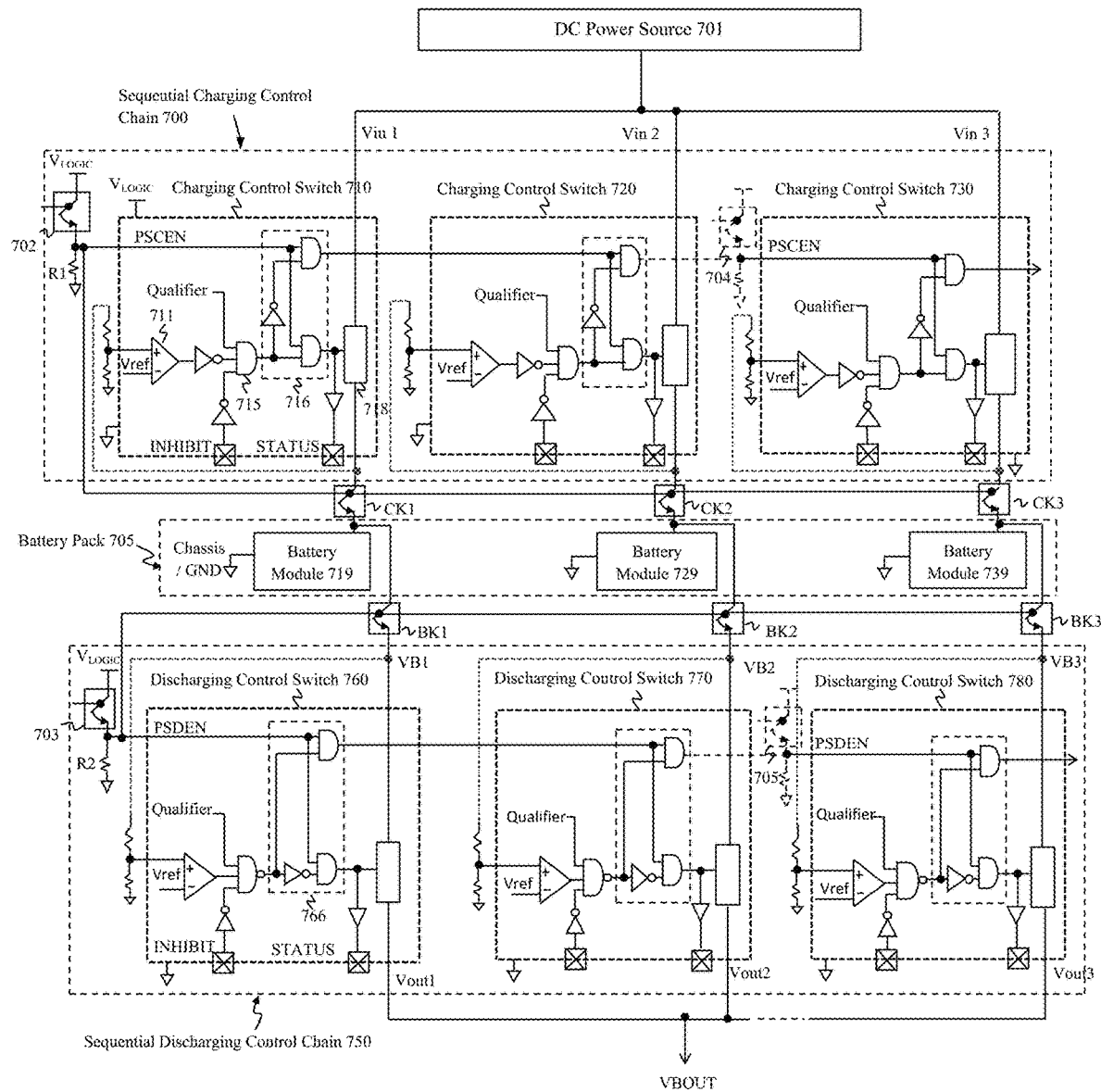
FIG. 7 illustrates an example of sequential charging and discharging control chains coupled to a set of battery modules, in accordance with one embodiment of the present disclosure.

FIG. 7 is a schematic diagram of a sequential charging and discharging control for a set of battery modules 719, 729, 739 in battery pack 705, in accordance with one embodiment of the present disclosure. Battery pack 705 is shown as being coupled to a sequential charging control chain 700 adapted to perform sequential charging, and also coupled to a sequential discharging control chain 750 adapted to perform sequential discharging. The sequential charging and discharging may take place concurrently. Although only three charging control switches and three discharging control switches, i.e., only three stages, are shown, with each charging and discharging stage associated with one of the battery modules, it is understood that embodiments of the present application are not so limited and equally apply to any number of stages. As shown each stage includes a charging control switch in the charging control chain 700, a battery module in battery pack 705, an optional switch $CK_i$ for battery charging protection and an optional switch $BK_i$ for battery discharging protection, and a discharging control switch, where "i" is an index ranging from 1 to 3 in this example. Although the positivity output is chosen to activate the transfer device in the charging control switch and the negativity output is chosen to activate the transfer device in the discharging control switch, it is understood that different configurations may also be used.

In FIG. 7, a normally-open key switch 702 is chosen to initiate the operation of the sequential charging control chain 700, which includes charging control switches 710, 720 and 730. When a control switch in a charging control chain meets the activation conditions, such as a coupled battery module being in place, or the energy in a coupled battery module being below a predefined value, or no abnormalities in control switch being detected, and the loke, then the control switch is activated to charge its coupled battery module. Otherwise, the control switch will be skipped to search for another subsequent control switch in the control chain that meets the activation condition to activate. The search for a control switch in the control chain to be activated could be as fast as an AND gate delay per stage. A control switch and its subsequent switch to be activated are normally back-to-back in most cases.

In an embodiment, the demultiplexer in the control switch controls the switching from a control switch (e.g., 710) to a subsequent control switch (e.g., 720) without a handshake protocol. The switching time to de-activate a control switch (e.g., 710) and to activate a subsequent control switch (e.g., 720) in the control chain 700 is also controllable by the demultiplexer (e.g., 716) in the control switch (e.g., 710), where the assertion and the desertion of the positivity output and the negativity output, respectively, in the control switch (e.g., 710) can be controlled by adjusting the internal delay in the demultiplexer (e.g., 716).

A set of normally-open switches CK1, CK2 and CK3 are shown as being disposed between the charging control switches 710, 720, 730 and the battery modules 719, 729, 739 respectively. When the key switch 702 is open, the pull-down resistor R1 connected to key switch 702 will keep all switches CK1, CK2 and CK3 open to prevent potential power leakage from battery modules, such as due to the presence of a current path in voltage divider connected to battery module. When the key switch 702 is closed, all CK1, CK2, and CK3 switches are closed, thereby enabling the charging control switches 710, 720, 730 to connect to their respective battery modules 719, 729, 739 in the sequential charging chain 700.

It is possible to divide the charging control chain into multiple sub-control chains. For example, the link connection between the negativity output of control switch 720 and the enable input PSCEN of control switch 730 is disconnected and a key switch 704 is connected to the PSCEN input to control switch 730, then two sub-control chains, where one consists of control switches 710, 720 and the other consists of control switch 730, are formed. When the same DC power source is applied to multiple sub-control chains, then power charging to the multiple sub-control chains proceeds in parallel. Different DC power sources may be connected to different sub-control chains to charge sub-control chains respectively when the DC power sources are available. A microcontroller may be used to activate the control chain or portions of the control chain, instead of using a key switch.

In the sequential discharging control chain 750 is shown as including the discharging control switches 760, 770, 780, where a separate normally-open key switch 703 initiates the operation of the sequential discharging control chain 750. The output timing of demultiplexer (e.g., 766) in its associated discharging control switch (e.g., 760) may be adjusted to enable concurrent switching to a subsequent discharging control switch (e.g., 770) to minimize power glitch during the discharging power transition in control chain 750.

A set of normally-open switches BK1, BK2 and BK3 are shown as being disposed between the battery modules 719, 729, 739 and the discharging control switches 760, 770, 780, respectively. When, for example, key switch 703 is open, the pull-down resistor R2 coupled to the output of key switch 703 will keep all switches BK1, BK2, BK3 open to prevent power leakage from battery modules 719, 729, 739. When switch 703 is closed, switches BK1, BK2, BK3 will be closed to couple battery module 719, 729, 739 to their respective discharging control switches 760, 770, 770 to enable sequential power discharging for the set of battery modules in the control chain 750.

Similarly, in some embodiments, the discharging control chain may be divided into multiple sub-control chains with each sub-control chain being enabled by an associated key switch. For example, when the link connection between the negativity output of control switch 770 and the PSDEN input to control switch 780 is disconnected and a key switch 705 is connected to the PSDEN input of the control switch 780, then two discharging sub-control chains, where one consists of control switches 760, 770 and the other consists of switch 780, are formed. When the outputs of both discharging sub-control chains are coupled together and both key switches 703, 705 are closed, then both sub-control chains will discharge power simultaneously to double the VOUT power output. When the discharging control chain is partitioned into multiple sub-control chains with outputs of all sub-control chains being coupled together, then the output current of the discharging control chain will be increased by multi-folds when all switch keys are closed to enable the sub-control chains. The output of discharging sub-control chain may be sourced for different applications. The highest power output from the discharging control chain 750 is achieved when all control switches are enabled to operate in parallel.

The sequential charging control chain 700 and the sequential discharging control chain 750 are adapted to perform sequential charging control and sequential discharging control concurrently. The control switches in both charging and discharging control chains are adapted to avoid collision when the same battery module is accessed for charging and discharging concurrently. Using the battery module 719 as an example, if the battery module 719 has sufficient energy, the comparator 711 in the charging control switch 710 will saturate to a logic high and its inverted output will negate the select control signal at AND 715 to disable the transfer device 718 in the charging control switch 710. This causes the battery module 719 to be disconnected and thus prevents battery module 719 from being charged by the DC power source 701 when the battery module is enabled to be discharged, regardless of whether the control switch 710 is activated by the charging control chain 700 for charging. Thus, when a battery module has sufficient energy to undergo discharging, the battery module will be skipped by the charging control chain so as not to be charged.

Conversely, if a battery module does not have sufficient energy, the battery module's corresponding discharging control switch is prevented from activating its transfer device to source energy in the discharging control chain. Thus, when, for example, the charging control switch 710 in the control chain 700 has been enabled to charge its battery module 719, the discharging of the battery module 719 is prevented automatically.

In an embodiment, the charging control chain and the discharging control chain coupled to same set of battery modules in a battery pack will not charge and discharge the same battery module at the same time, and thus are adapted to operate seamlessly for battery charging and discharging under the control of control switches linked in charging and discharging control chains. Preventing a DC power source 701 from supplying power to a battery module when the battery module is being discharging avoids voltage contention between the DC power input and the battery module's output at VBOUT.

The control chain configuration in FIG. 7 may be used to harvest energy from various DC power sources. To simultaneously harvest energy from multiple DC power sources to charge a battery pack, a charging control chain may be divided into multiple sub-control chains to enable concurrent charging by various power sources, where a sub-control chain is coupled to a respective DC power source to power the charging control switches controlled by a charging sub-control chain. In EV applications, such multiple DC power sources may include, for example, the power charger, the energy harvested from solar panel installed on the EV's body surface, and the potential energy harvested from piezoelectric membranes affixed along the air flow path. The air flow induces bending and vibrations of the piezoelectric membranes from which energy may be harvested energy during driving.

Figure 8A:
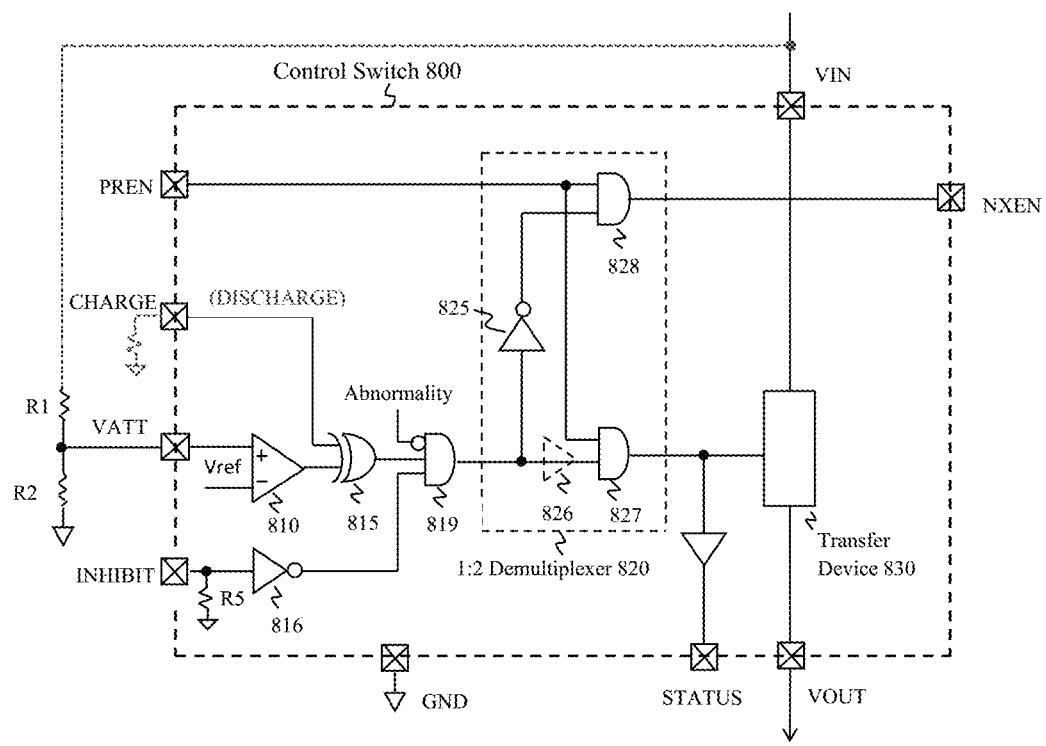
FIG. 8A illustrates an exemplary control switch for charging or discharging control, in accordance with one embodiment of the present disclosure.
Figure 8B:
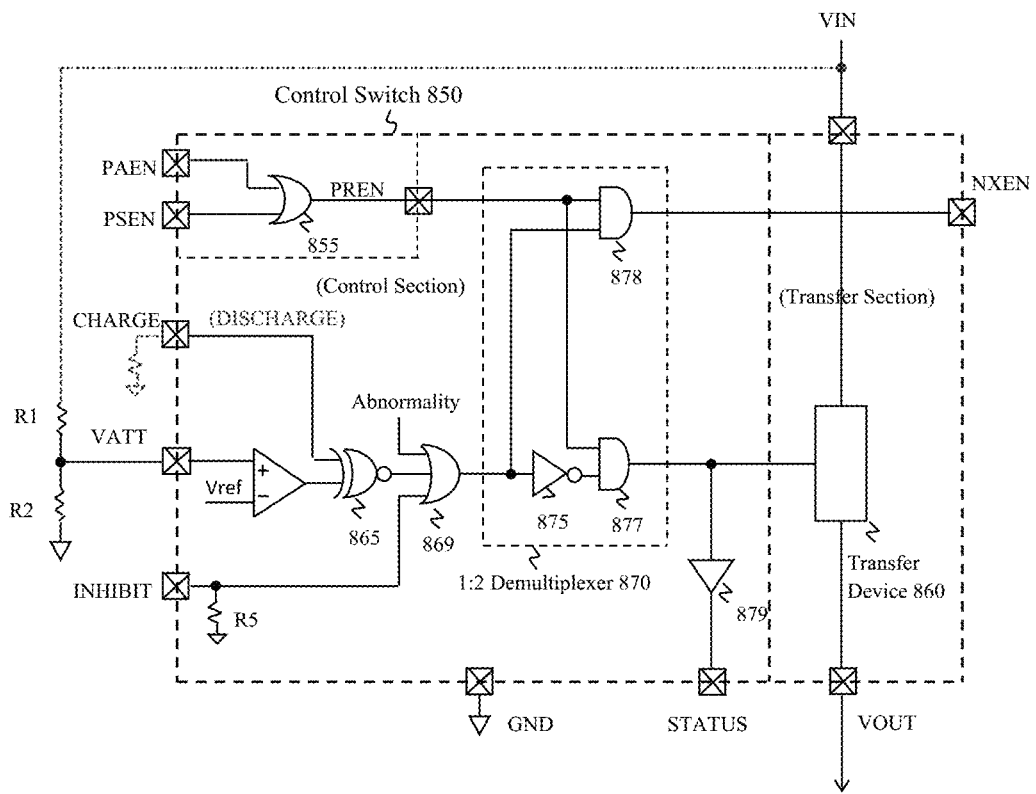
FIG. 8B illustrates another exemplary control switch for charging or discharging control, in accordance with one embodiment of the present disclosure.
Figure 8C:
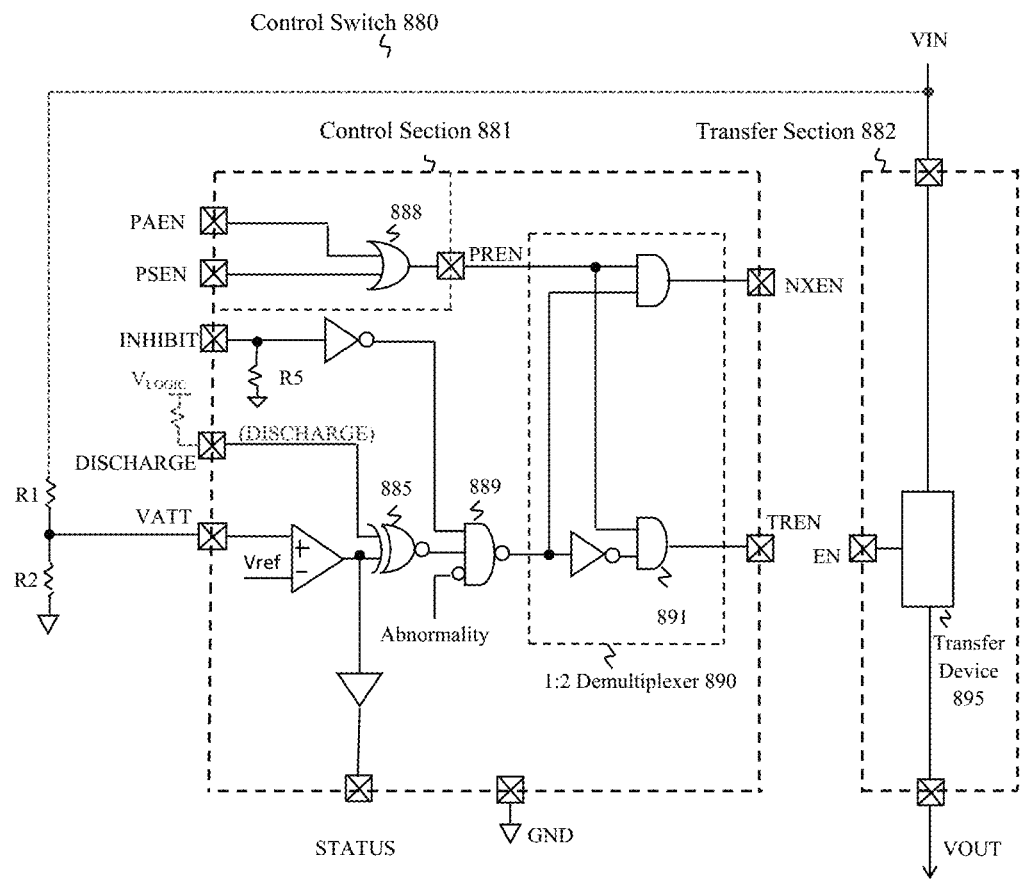
FIG. 8C illustrates an exemplary control switch chipset for parallel and sequential charging or discharging control, in accordance with one embodiment of the present disclosure.

FIG. 8A illustrates an exemplary switch adapted to control power charging or power discharging, in accordance with one embodiment of the present disclosure. The configuration of a charging control switch and a discharging control switch are different in that the battery module is coupled to the power input port for discharging and is coupled to the power output port for charging, and that the comparison device in the charging control switch monitors if energy in a coupled battery module is below a predefined level to initiate the energy charging operation, while the comparison device in the discharging control switch monitors if energy in a coupled battery module is above a predefined level before initiating the energy discharging operation. Both control switches differ in the polarity of comparator output for active charging and for active discharging. Although the configurations of FIGS. 8A-8C are suitable for charging or discharging applications, only the discharging operation is illustrated.

Referring to FIG. 8A, a two-input exclusive OR gate 815 receives the output of comparator 810 at one of its input terminals, and receives control signal CHARGE at its other input terminal. Signal CHARGE is also an input to the control switch 800 which is adapted to function as a charging control switch, if the CHARGE control signal is set to a logic high or "1", where XOR 815 acts as an inverter as is also shown in control switch 100 of FIG. 1A.

The XOR gate 815 operates as a pass-through buffer if signal CHARGE is at a logic low or "0". When signal CHARGE is set to "0", control switch 800 operates as a discharging control switch, as is also shown in the discharging control switch 400 of FIG. 4A. The second input to XOR 815 is the output of comparator 810, which monitors an attenuated voltage at power input VIN. For charging operation, VIN of control switch 800 is coupled to an external DC energy source with VOUT output coupled to a battery module or to a load. While for discharging operation, VIN is coupled to a battery module with VOUT to be connected for external use.

The XOR 815 output is shown as being ANDed with other qualifiers, such as an inverted INHIBIT input via inverter 816 and the detected results of abnormalities, using AND function 819, that in response generates the select control signal of 1:2 demultiplexer 820, where an inverted Abnormality signal indicates no abnormalities being encountered by control switch 800. The INHIBIT control is an optional feature for an external device to temporarily disable the power transfer function in control switch, if necessary. The 1:2 demultiplexer 820 controls the enabling of transfer device 830 and the switching to other control switch. The control switch 800 is applicable for charging or discharging operations by selecting the CHARGE control signal. The control switch 800 may be alternatively referred to herein as a "duality control switch".

FIG. 8B illustrates another exemplary switch adapted to control power charging or power discharging, in accordance with another embodiment of the present disclosure. Referring to FIGS. 8A and 8B, the positivity output which is adapted to activate the transfer device 830 in duality control switch 800 of FIG. 8A may be converted to the negativity output to activate the transfer device 860 of FIG. 8B, shown as being coupled to the demultiplexer 870 in control switch 850 in FIG. 8B. For the reconfiguration, the select control signal at output of AND 819 should also be inverted into NAND accordingly. The Boolean equivalence shown in control switch 850 of FIG. 8B includes the conversion of NAND into OR 869 in FIG. 8B, as well as the inversion of all its inputs in control switch 850, which include the inversion of XOR 815 to XNOR 865 and the elimination of inverters at the INHITBIT input and the abnormality inputs. The buffer 879 is an optional feature for power transfer status observation.

Referring to FIG. 8B, having the negativity output signal of the demultiplexer to drive the transfer device in a control switch is advantageous in concurrent switching control. For example, in control switch 850, by adjusting the device size of inverter 875, or using an odd number of inverters linked in series to replace the single inverter 875, or using a fixed or a programmable delay line with an inverted output, so that the total delay from select control signal at input to demultiplexer 870 through the inverter function 875 to negativity output to deactivate the transfer device 860 matches the total delay of positivity output through AND gate 878 to enable and to activate the transfer device in a subsequent control switch, then a concurrent switching in power multiplexing is achieved However, if the delay of inverter function 875 in demultiplexer 870 is adjusted to further extend the delay so that the transfer device in a subsequent control switch is fully turned on, while the transfer device 860 in the control switch 850 is still not turned off during power switching, then this achieves a make-before-break power multiplexing, which is useful in the applications where a load is connected to multiple power sources but cannot afford to have any interruption in the power supply to the load. Such extended delays are useful for the persistent power application.

By referring to FIG. 8A, similarly, the switching timing for transfer device 830 in control switch 800 may be adjusted by including a delay buffer device 826 at the positivity output path of demultiplexer 820, which may be a simple wire connection, a buffer, an even number of inverters in series, a delay line, or a programmable delay line with adjustable delay timing to achieve a concurrent switching or a break-before-make power multiplexing. In the break-before-make power multiplexing, the total delay from the assertion of select control signal, through the negativity output via AND gate 828 and the demultiplexer of a subsequent control switch to activate its transfer device is longer than the total delay to the positivity output to deactivate the transfer device 830 in control switch 800. The break-before-make power multiplexing is useful in the applications where multiple DC power sources of different voltages are connected to power a load. The adjustment of delay timing at the two demultiplexer outputs in control switch is distinct and advantageous.

In an embodiment, the transfer device 830, 860 of FIG. 8A, 8B may be an external device to provide more flexibility for use by a heavier power load as shown in FIG. 8C. The transfer device in the transfer section 882 of control switch 880 in FIG. 8C may be an off-the-shelf device, while the control section 881 may be implemented using discrete devices or as one or more integrated circuits.

The duality control switch 800 in FIG. 8A may be re-configured to use an inversion of the CHARGE signal, i.e., DISCHARGE, as an external control for discharge operation. When the inversion of CHARGE is selected as a control input, the XOR 815 in FIG. 8A is inverted and replaced by XNOR 885 as shown in FIG. 8C. In FIG. 8C, when the DISCHARGE input is a logic high or "1", the XNOR 885 functions as a pass-through buffer and the control switch 880 becomes as a discharging control switch. When the DISCHARGE input is a logic low or "0", the XNOR 885 functions as an inverter and the control switch 880 operates as a charging control switch. The output of NAND gate 889, which is an inversion of the select control AND in control switch 800 shown in FIG. 8A, provides the select control signal of demultiplexer 890 in control switch 880. Thus, the transfer device 895 in control switch 880 is changed to couple from the positivity output to the negativity output.

An optional parallel charging and discharging operations may be included in control switch 880. This is achieved by incorporating a second control enable signal PAEN, i.e., a parallel enable or a pairing enable, at the input of control switch 880 to OR with the sequential enable signal PSEN by OR gate 888 to generate a new enable signal PREN to apply to the control section 881 in control switch 880, which is also a new enable input to the demultiplexer 890.

Figure 9:
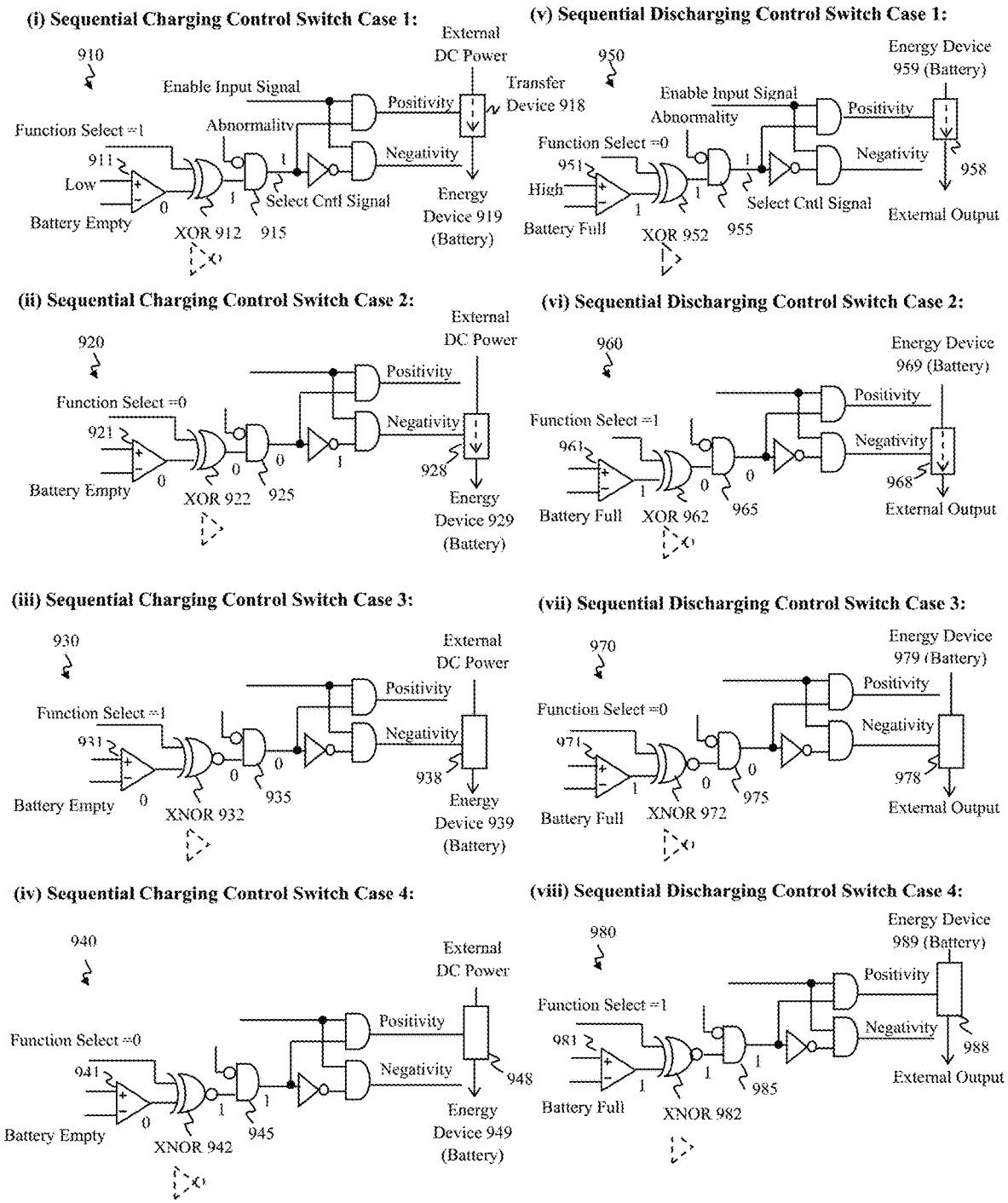
FIG. 9 illustrates various examples of using XOR/XNOR control switches for sequential charging or discharging control, in accordance with one embodiment of the present disclosure.

FIG. 9 shows a variety of examples using XOR/XNOR gates, in part, in the implementation of charging or discharging operations for the duality control switch, where four cases are illustrated for sequential charging control and four cases are also illustrated for sequential discharging control. Only the AND function is illustrated in the derivation of the select control signal for duality control switch. If the NAND function is also included in the derivation of the select control signal, then the number of configurations of a duality control switch in charging or discharging operation is doubled. Rather than using a specific CHARGE or DISCHARGE to name the control input of duality control switch, a neutral name "Function Select" is used instead. Regardless of the CHARGE or DISCHARGE signal being a "1" or "0", the duality control switch can perform either as a charging control switch or as a discharging control switch. Using "function select" to name the input control signal avoids such a confusion.

In FIG. 9, all illustrations (i)-(viii) assume the enable input signal to the duality control switch is asserted. The illustration (i) is a sequential charging control switch of case 1, where comparator 911 compares an attenuated voltage derived from energy device (or battery) 919 coupled to control switch 910. When the attenuated voltage detected by comparator 911 causes the comparator output to saturate to a logic low or "0", it means there is no sufficient energy in energy device 919, where "battery empty" is used to represent such a situation hereinafter. When the function select is a positive input or "1", the XOR gate 912 inverts the comparator output to have a high or "1" at the AND 915 output as select control signal to assert positivity output at control switch 910. If transfer device 918 is selected to couple to positivity output, the assertion of positivity output will activate the external DC power source to charge energy device 919 or battery, a sequential charging control switch 910 is formed.

The illustration (ii) of FIG. 9 shows a sequential charging control switch of case 2. When battery is empty to cause comparator's 921 output to saturate to a logic low or "0", and when function select is a negative input or "0", the XOR gate 922 buffers comparator's 921 output to have a low or "0" at the AND 925 output as select control signal to assert the negativity output at control switch 920. If transfer device 928 is selected to couple to the negativity output, the assertion of negativity output will activate the external DC power source to charge energy device 929 or battery, a sequential charging control switch 920 is thus formed.

The illustration (iii) shows a sequential charging control switch of case 3. When battery is empty, the comparator 931 saturates to a logic low or "0". And when the function select is a positive input or "1", the XNOR gate 932 buffers the comparator 931 output to have a low or "0" at AND 935 output as select control signal to assert negativity output. If transfer device 938 is coupled to the negativity output of control switch 930, the assertion of negativity output will activate transfer device 938 for external DC power source to charge energy device 939 or battery, a sequential charging control switch 930 is formed.

The illustration (iv) shows a sequential charging control switch of case 4. When battery is empty, the comparator 941 saturates to a logic low or "0". And when the function select is a negative input or "0", the XNOR gate 942 inverts comparator's 941 output to have a high or "1" at the AND 945 output as select control signal to assert positivity output. If the transfer device 948 is coupled to the positivity output of control switch 940, the assertion of positivity output will activate transfer device 948 for external DC power source to charge energy device 949 or battery coupled to control switch 940, a sequential charging control switch 940 is thus formed.

Referring to (i) and (iii), or (ii) and (iv) in FIG. 9, when the function select input is kept unchanged, by changing XOR to XNOR in the pair of charging control switches 910 and 930, or changing XNOR to XOR in the pair of charging control switches 920 and 940, the coupling of transfer device to positivity output or to negativity output in each pair of control switches shall be exchanged accordingly to perform as charging control switch, except that the characteristic of output timing in each pair of control switches is altered.

The illustration (v) of FIG. 9 shows a sequential discharging control switch of case 1, where comparator 951 compares an attenuated voltage derived from energy device (or battery) 959 coupled to control switch 950. When the attenuated voltage detected by comparator 951 causes the comparator output to saturate to a logic high or "1", it means a sufficient energy in energy device 959 and "battery full" is used to represent such a situation hereinafter. When function select is a negative input or "0", the XOR gate 952 buffers comparator output to have a high or "1" at the AND 955 output as select control signal to assert positivity output. If transfer device 958 is coupled to the positivity output of control switch 950, the assertion of positivity output will activate transfer device 958 to output energy from energy device 959 for external use, a sequential discharging control switch 950 is thus formed.

The illustration (vi) of FIG. 9 shows a sequential discharging control switch of case 2. When energy device 969 or battery coupled to control switch 960 is full, comparator 961 saturates to a logic high or "1". And when function select is a positive input or "1", the XOR gate 962 inverts the comparator's 961 output to have a low or "0" at the AND 965 output as select control signal to assert negativity output. If transfer device 968 is coupled to the negativity output of control switch 960, the assertion of negativity output will activate transfer device 968 to transfer energy from energy device 969 for external use, a sequential discharging control switch 960 is thus formed.

The illustration (vii) of FIG. 9 shows a sequential discharging control switch of case 3. When energy device 979 or battery coupled to control switch 970 is full, comparator 971 saturates to a logic high or "1", and when the function select is a negative input or "0", the XNOR gate 972 inverts the comparator's 961 output to be a low or "0" at the AND 975 output as select control signal to assert negativity output. If transfer device 978 is coupled to the negativity output of control switch 970, the assertion of negativity output will activate transfer device 978 to transfer energy from energy device 979 for external use, a sequential discharging control switch 970 is thus formed.

Similarly, the illustration (viii) of FIG. 9 shows a sequential discharging control switch of case 4. When energy device 989 or battery coupled to control switch 980 is full, comparator 981 saturates to a logic high or "1". And when function select is a positive input or "1", the XNOR gate 982 buffers the comparator's 981 output to have a high or "1" at the AND 985 output as select control signal to assert the positivity output. If transfer device 988 is coupled to the positivity output of control switch 980, the assertion of positivity output will activate transfer device 988 to transfer energy from energy device 989 for external use, a sequential discharging control switch 980 is also formed.

Referring to (i) and (v), (ii) and (vi), (iii) and (vii), or (iv) and (viii), both control switches 910 and 950, 920 and 960, 930 and 970, or 940 and 980 have the same configuration. It simply to apply a proper function select input, a duality control switch can be used as a charging control switch or as a discharging control switch. For example, the XOR control switch 910 is a charging control switch when the function select is a positive input, and it becomes a discharging control switch when the function select is a negative input, as shown in control switch 950. Similarly, for example, the XNOR control switch 930 is a charging control switch when the function select is a positive value, and it becomes a discharging control switch when the function select is a negative value, as shown in control switch 970.

Referring to (v) and (vi), or (vii) and (viii) of FIG. 9, for a discharging control switch, when the function select is changed from 0 to 1, and the transfer device is recoupled from negativity output to positivity output as shown in control switches 950 and 960, or recoupled from positivity output to negativity output as shown in control switches 970 and 980, the discharging functionality is unchanged, except that the output timing characteristic is altered. Similar conversion is applicable for charging control switches (i) and (ii), or (iii) and (iv), where when function select input is changed from 1 to 0, and the transfer device is reconnected from positivity output to negativity output as in control switches 910 and 920, or from negativity output to positivity output as in control switches 930 and 940, the charging functionality is unchanged, except that the output timing characteristic is altered.

Referring to (v) and (viii), or (vi) and (vii) of FIG. 9, if not to change the external coupling of the negativity output or the positivity output, i.e., not to change the output timing characteristic of discharging control switch, this can be achieved by changing the input to function select and exchanging XOR and XNOR in control switch. This is also applicable for charging control switch, which is obvious by observing (i) and (iv), or (ii) and (iii).

Figure 10:
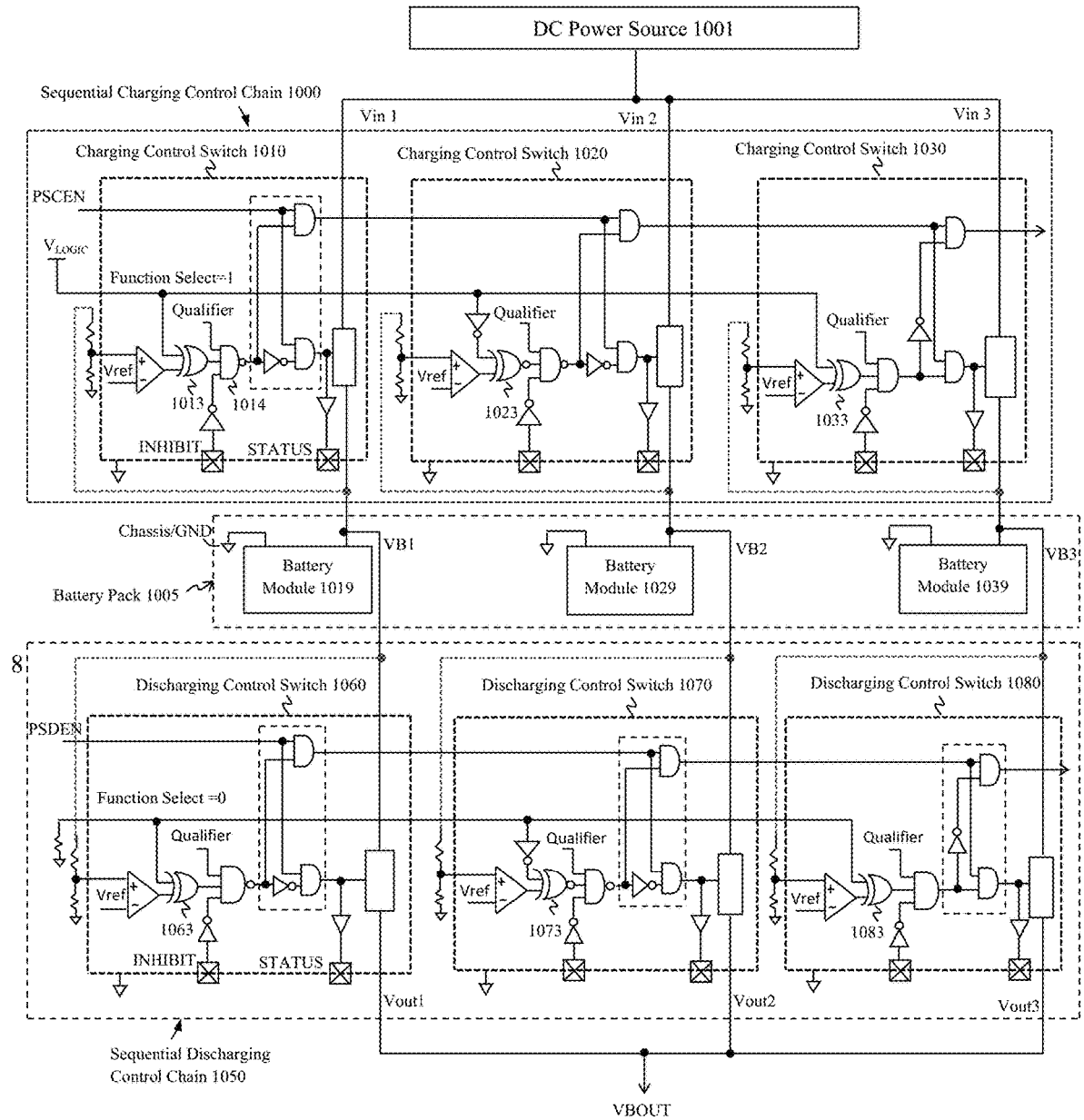
FIG. 10 illustrates an example of using various XOR control switches for sequential charging and discharging control chains coupled to a set of battery modules, in accordance with one embodiment of the present disclosure.

FIG. 10 is a schematic diagram of a control circuit adapted to perform sequential charging and discharging for a number of battery modules, in accordance with one embodiment of the present disclosure. The duality control switch, as described above, is used to implement the sequential charging control chain 1000 and the sequential discharging control chain 1050 for the exemplary battery modules 1019, 1029, 1039 in battery pack 1005. Although only three battery module and control switches are shown in the example, it is understood that any number of battery modules and control switches may be used. The operation and functionality of sequential charging control chain 1000 and sequential discharging control chain 1050 are similar to those described with reference to the sequential charging control chain 700 and the sequential discharging control chain 750 shown in FIG. 7.

When the function select input to duality control switches 1010, 1020, 1030 in the charging control chain 1000 is tied to a logic high or $V_{LOGIC}$, it enables XOR gates 1013, 1023, 1033 disposed in the duality control switches 1010, 1020, 1030 respectively, to function as an inverter for each of the duality control switches 1010, 1020, 1030 to be a charging control switch. Thus, the control chain 1000 is functioning as a sequential charging control chain.

Conversely, if the function select input is tied to the ground, or to a logic low state, then the XOR gates 1063, 1073, 1083 in the duality control switches 1060, 1070, 1080 respectively operate as passing-through buffers, and the duality control switches 1060, 1070, 1080 perform as discharging control switches. The control chain 1050 therefore functions as a sequential discharging control chain. By applying proper function select input to the duality control switches linked in a control chain, the control chain may function as a sequential charging control chain or as a sequential discharging control chain.

In an embodiment, a second enable input signal may be included in the control switch to enhance functionality of a linked control chain. For example, as shown in FIG. 8B, a PAEN signal, namely a parallel enable signal, may be ORed with a sequential enable input signal PSEN to generate a new enable input PREN for control switch 850.

Figure 11:
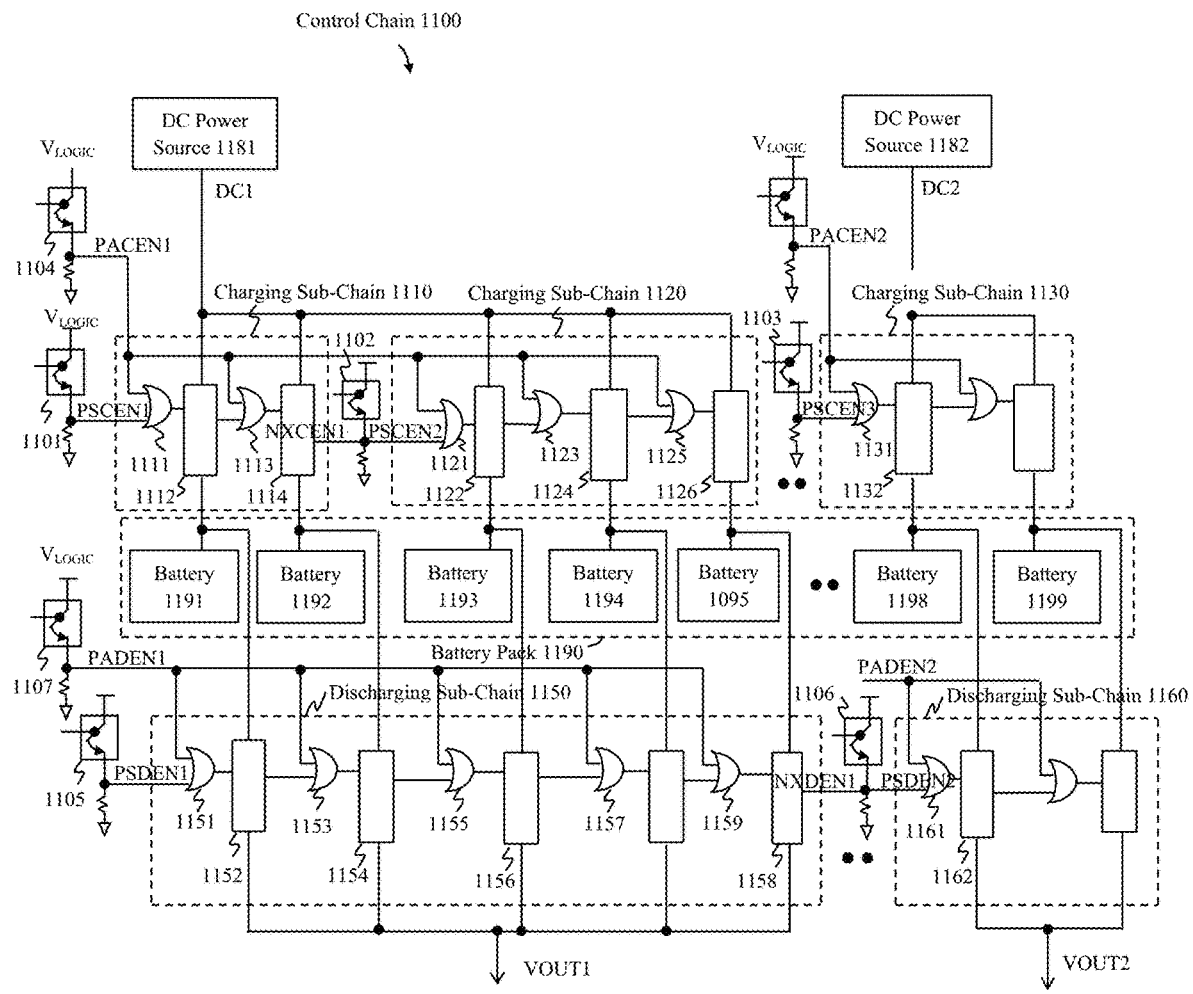
FIG. 11 illustrates an exemplary control chain configuration embedded with sub-control chains, in accordance with one embodiment of the present disclosure.

FIG. 11 is an exemplary control chain configured by control switch incorporating an external OR function, in accordance with one embodiment of the present disclosure. The control chain 1100 includes a set of batteries 1191, 1192, . . . , 1199 bundled in a battery pack 1190 coupled to a charging control chain, consisting of charging sub-chains 1110, 1120, and 1130 for various charging operation, and a discharging control chain, consisting of discharging sub-control chains 1150, 1160 for various discharging operation.

The OR function coupled to each control switch receives two inputs, i.e., a sequential enable input and a parallel enable input. The sequential enable input signal may be an enable output from a prior control switch, or may be asserted by a key switch or by a microcontroller. For example, if key switch 1101, 1102, 1103, 1105, or 1106 is used to enable sub-chain 1110, 1120, 1130, 1150, or 1160, by closing key switch 1101, 1102, 1103 to assert PSCEN1, PSCEN2, PSCEN3 signal as input to OR gate 1111, 1121, 1131 to enable the first control switch 1112, 1122, 1132 of respective sub-chain 1110, 1120, 1130, it would enable the charging of all sequential sub-chains 1110, 1120, and 1130 concurrently, where in each sub-chain its linked control switch would be charged sequentially. This is different from closing key switch 1104 to assert PACEN1 enable signal, being input to all OR gates 1111, 1113, 1121, 1123, and 1125 to enable all control switches 1112, 1114, 1122, 1124 and 1126 in sub-chains 1110 and 1120 to receive DC power source 1181 to charge the set of batteries 1191, 1192, . . . , 1195 in parallel. Either conducting parallel charging for all control switches in sub-chains or conducting 'parallel sequential' charging for all sub-chains, it depends upon the availability and strength of DC power source for charging.

The two sub-chains 1110 and 1120 may be linked into a single extended sub-chain by coupling the enable output PSCEN2 from the control switch 1114 of sub-chain 1110 to the PSCEN2 enable input to control switch 1122 of sub-chain 1120, where the key switch 1102 may be coupled to enable the sub-chain 1120 separately. The NXCEN1 may be ORed with PSCEN2 before input to OR gate 1121 coupled to control switch 1122. Different DC power sources, such as DC power source 1181, 1182, may be supplied to charge different sub-chains, such as sub-chains 1110, 1130. More parallel charging to batteries or sub-chains of battery concurrently reduces charging time for battery pack 1190.

Similarly, by the closing key switch 1105, 1106 to assert PSDEN1, PSDEN2 as input to OR gate 1151, 1161 to enable the first control switch 1152, 1162 of respective sub-chain 1150, 1160 would enable concurrent sequential discharging of sub-chains 1150, 1160. The VOUT1 of sub-chain 1150 and the VOUT2 of sub-chain 1160 may be two separate outputs for different application use. They may be coupled together to increase the output current from battery pack 1190. When more sub-chains are enabled concurrently to discharge energy and have output coupled together, the output current increases. However, the highest output current from a discharging sub-chain, for example the sub-chain 1150, is to assert the PADEN1 parallel enable signal to enable all control switches in the sub-chain 1150 to output their power concurrently.

Similarly, the sub-chain 1150 may be linked to the sub-chain 1160 to form an extended sequential discharging chain by coupling the enable output NXDEN1 from the control switch 1158 of sub-chain 1150 to the PSDEN2 enable input of sub-chain 1160, where the switch key 1106 may be coupled to enable the discharging of sub-chain 1160 separately. The NXDEN1 output may be ORed with the output from key switch 1106 to become the PSDEN2 input to OR gate 1161 coupled to control switch 1162.

Figure 12:
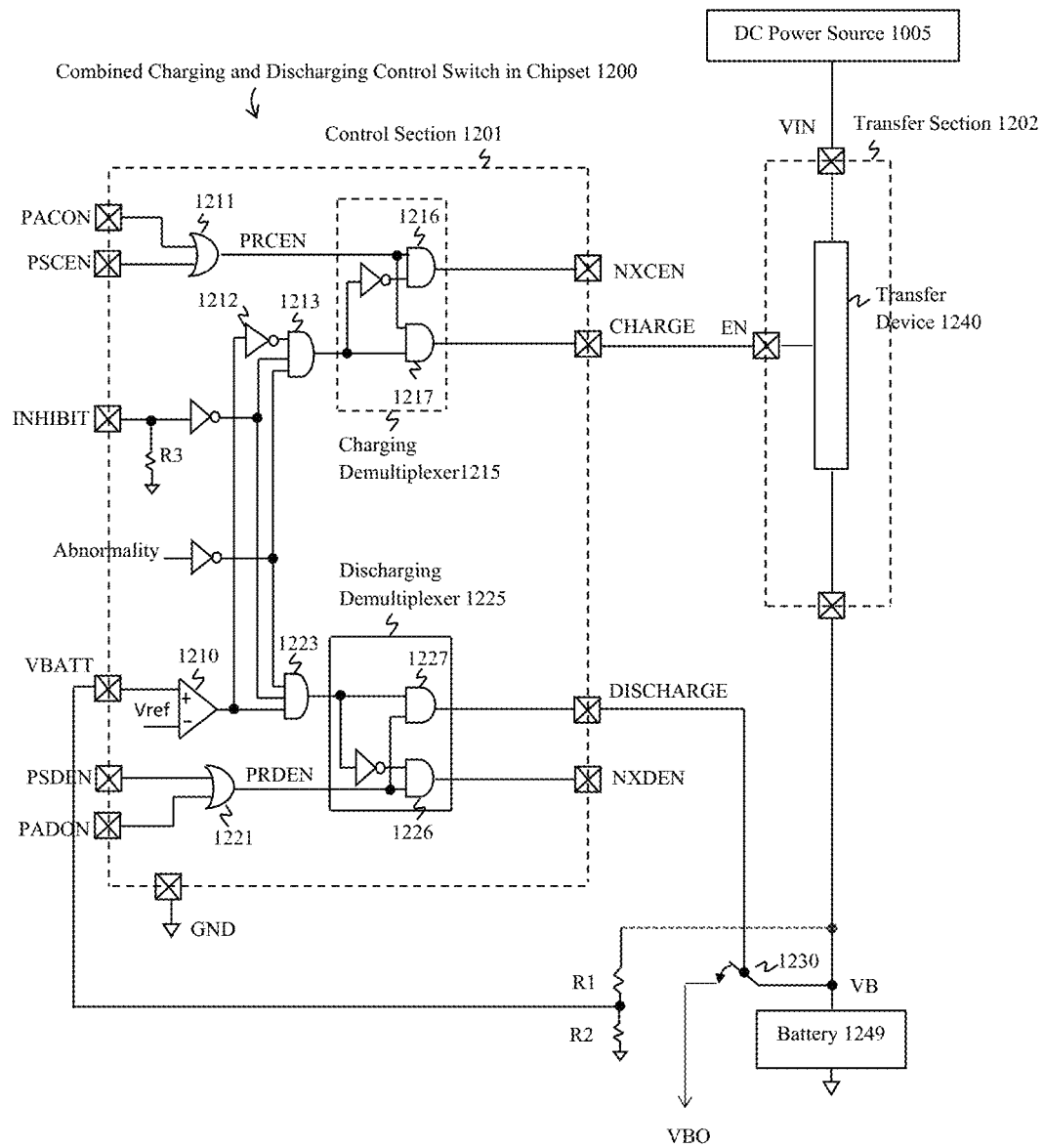
FIG. 12 illustrates an exemplary control switch chipset for parallel and sequential charging and discharging control, in accordance with one embodiment of the present disclosure.

FIG. 12 shows an example of a circuit, in accordance with one embodiment of the present disclosure that combines a charging control switch and a discharging control switch in a chipset to facilitate both charging and discharging control for a battery module, where the control sections of charging control switch and discharging control switch are combined, but the transfer device is separated from the control section to increase its flexibility to support different power rating in applications. Such a configuration may be alternatively referred to as a "combined control switch in chipset". Single transfer device is sufficient if to charge and discharge to the same battery module. This is because when a battery has sufficient energy for discharge, it does not need to charge at the same time.

The exemplary combined charging and discharging control switch in chipset 1200 shown in FIG. 12 includes a control section 1201 and a separate power transfer section 1202, where the control section 1201 comprises, in part, a charging demultiplexer 1215 to generate charging control outputs NXCEN and CHARGE for charging operation, and a discharging demultiplexer 1225 to generate discharging control outputs NXDEN and DISCHARGE for discharging operation. Both demultiplexers 1215, 1225 use the same comparator 1210 to generate respective select control signal.

The comparator 1210, which compares an attenuated voltage VBATT from voltage divider R1, R2 coupled to battery module 1249, with a reference voltage Vref, to generate a comparator output, where AND gate 1213 receives the inversion of comparator output, the inversion of abnormality input and the inversion of external INHIBIT control to generate select control signal for the charging demultiplexer 1215, while the AND gate 1223 receives the comparator output, the inversion of abnormality input and the inversion of external INHIBIT control to generate select control signal for the discharging demultiplexer 1225.

The charging demultiplexer 1215 receives PRCEN as its input, which ORs two external enable signals, including a sequential enable input PSCEN for linking to a front charging control switch and a second enable input PACON useful to enable parallel charging operation for control switches linked in a charging control chain. The charging demultiplexer 1215 generates two control outputs, including NXCEN signal, which is a negativity output from ANDing the PRCEN with the inversion of select control signal generated by AND function 1213 for linking and enabling a follower control switch, and a CHARGE signal, which is a positivity output from ANDing the PRCEN with the select control signal for activating the transfer device 1240 to charge a coupled battery 1249. The external coupling of positivity output and negativity output can be exchanged when the AND 1213 output is inverted, where the inverted AND function 1213 may be Boolean converted to OR function with all its inputs also inverted.

The discharging demultiplexer 1225 receives PRDEN as its input, which ORs two external enable signals, including a sequential enable input PSDEN for linking to a front discharging control switch and a second enable input PADON useful to enable parallel discharging operation for control switches linked in a discharging control chain. The discharging demultiplexer 1225 generates two control outputs, including NXDEN signal, which is a negativity output from ANDing the PRDEN with the inversion of select control signal generated by AND function 1223 for linking and enabling a follower discharging control switch, and a DISCHARGE signal, which is a positivity output from ANDing the PRDEN with the select control signal to control the closing of a normally-open switch 1230 when energy in battery 1249 is output for external use. The external coupling of positivity output and negativity output can be exchanged when the AND 1223 output is inverted, where the inverted AND function 1223 may be Boolean converted to OR function with all its inputs also inverted.

Figure 13A:
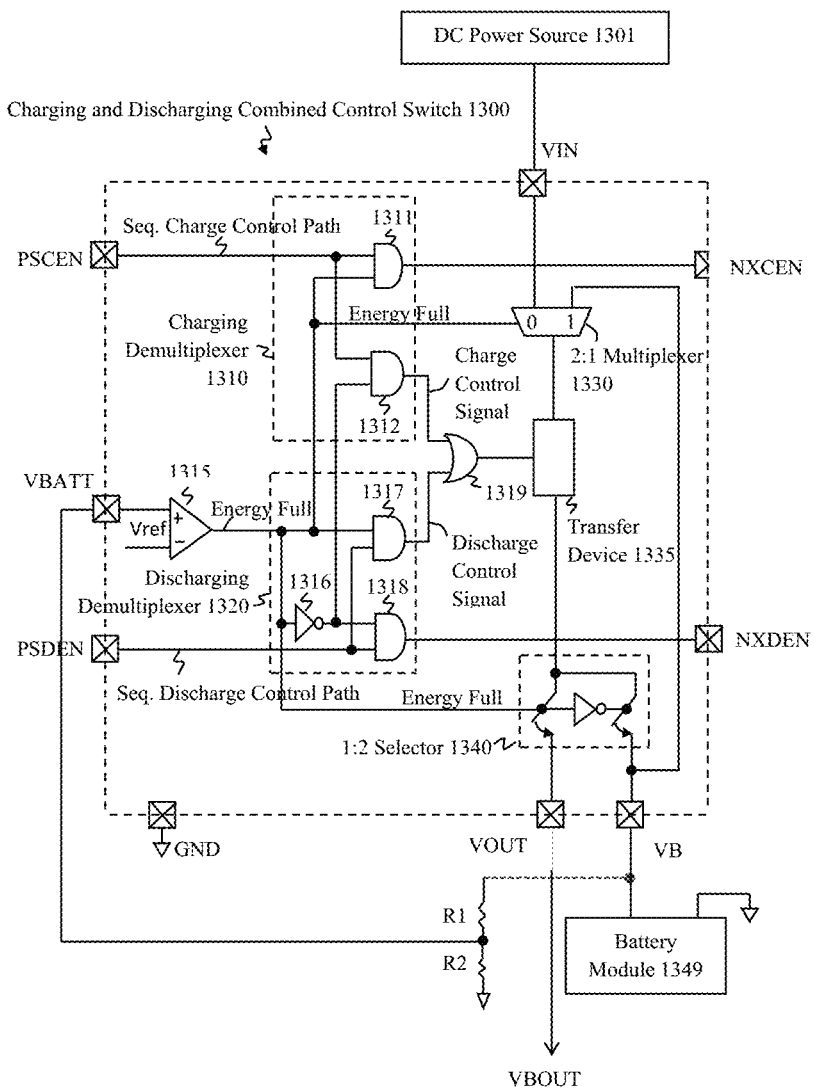
FIG. 13A illustrates a basic configuration of a combined sequential charging and discharging control switch, in accordance with one embodiment of the present disclosure.

FIG. 13A shows an example of a circuit that combines a charging control switch and a discharging control switch into a single control switch for charging and discharging a battery module, alternatively referred to as a "combined control switch" hereinafter, in accordance with one embodiment of the present disclosure. The combined control switch 1300 comprises, in part, a charging demultiplexer 1310, a discharging demultiplexer 1320, and a comparator 1315, which compares an attenuated voltage VBATT derived from voltage divider R1, R2 coupled to battery module 1349 to a reference voltage Vref, where the output of comparator saturates to a logic high or '1' when the battery module 1349 has sufficient energy in it or is 'energy full'.

The charging demultiplexer 1310 receives the comparator output to generate two outputs, where a positivity output, which ANDs an enable input signal PSCEN from a front charging control switch with comparator output by AND gate 1311 to generate NXCEN as link control and enable signal to a follower charging control switch, and a negativity output, which ANDs the enable input signal PSCEN with inversion of the comparator output by AND gate 1312 to generate an input for the OR function 1319.

The discharging demultiplexer 1320 receives the comparator output to generate two outputs, where a negativity output, which ANDs enable input signal PSDEN from a front discharging control switch with the inversion of comparator output by AND gate 1318 to generate NXDEN as link control and enable signal to a follower discharging control switch, and a positivity output, which ANDs the enable input signal PSDEN with the comparator output by AND gate 1317 to generate an input for the OR gate 1319. The output of OR gate 1319 activates transfer device 1335, when the combined control switch 1300 is activated for charging or discharging operation.

The combined control switch 1300 also includes a 2:1 multiplexer 1330, where its input is either selected from a DC power source 1301 when comparator output is a logic low or '0', or selected from battery module 1349 when comparator output is a '1'. The multiplexer output 1330 is input to transfer device 1335, where the output of transfer device 1335 is further coupled to a 1:2 selector 1340, which routes output to charge battery module 1349 when the comparator output is a '0', and outputs energy from battery module 1349 for external use when the comparator output is a '1'. The transfer device 1335 is in part of combined control switch 1300.

At any given time, either the positivity output via AND gate 1312 of charging demultiplexer 1310 or the negativity output via AND gate 1317 of discharging demultiplexer 1020 is enabled, but not both, depending upon if the comparator 1315's output being saturated to logic high or logic low. The discharging function takes a precedence over the charging function in the combined control switch 1300. When battery module 1349 has sufficient energy for output, the comparator output will select 2:1 multiplexer 1330 and 1:2 selector 1340 to output energy from battery module 1349 for external use, and not to charge the battery module then.

Figure 13B:
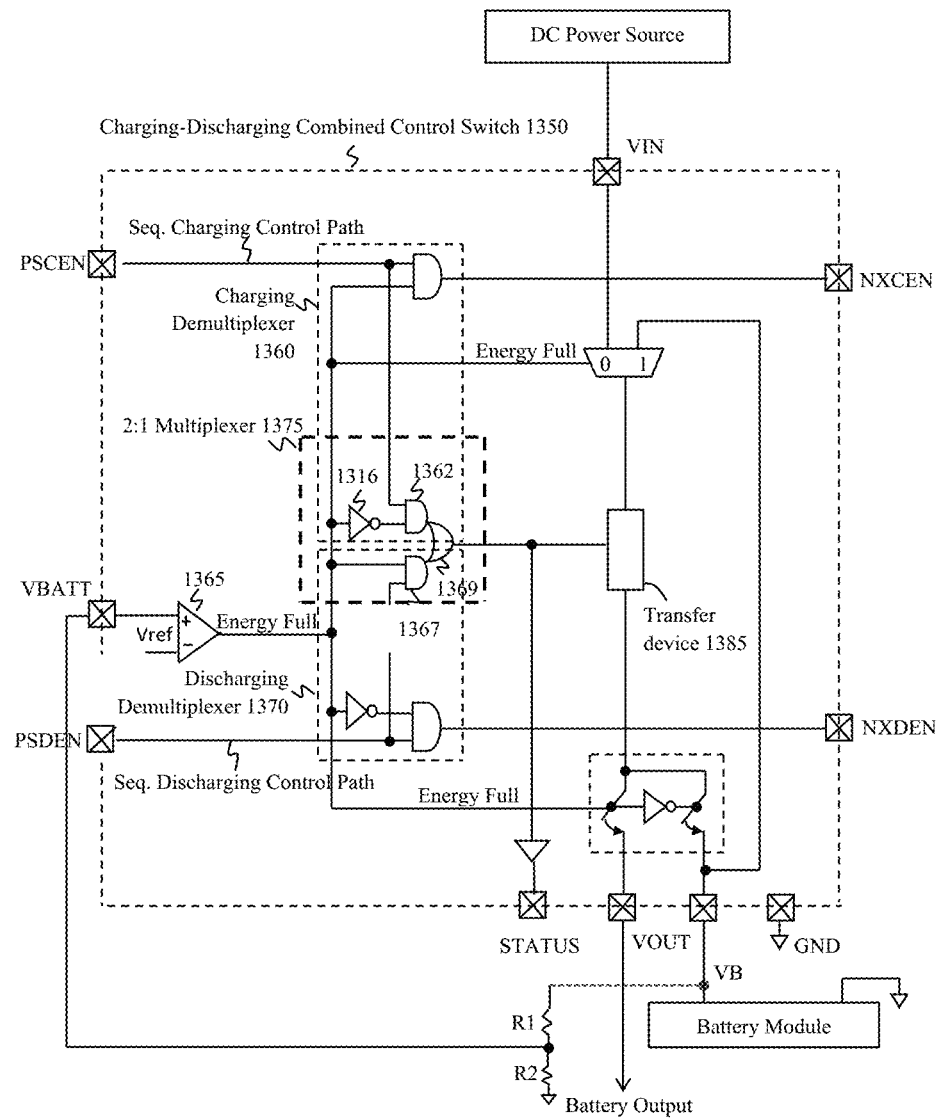
FIG. 13B illustrates an equivalent configuration of a combined sequential charging and discharging control switch, in accordance with one embodiment of the present disclosure.

In the charging and discharging combined control switch 1350 shown in FIG. 13B, the negativity output of the charging demultiplexer 1360 and the positivity output of the discharging demultiplexer 1370 are ORed by OR gate 1369 to form a 2:1 multiplexer 1375 to control the activation of transfer device 1385, where the output of compactor 1365 is used as select control signal for multiplexer 1375.

Figure 14:
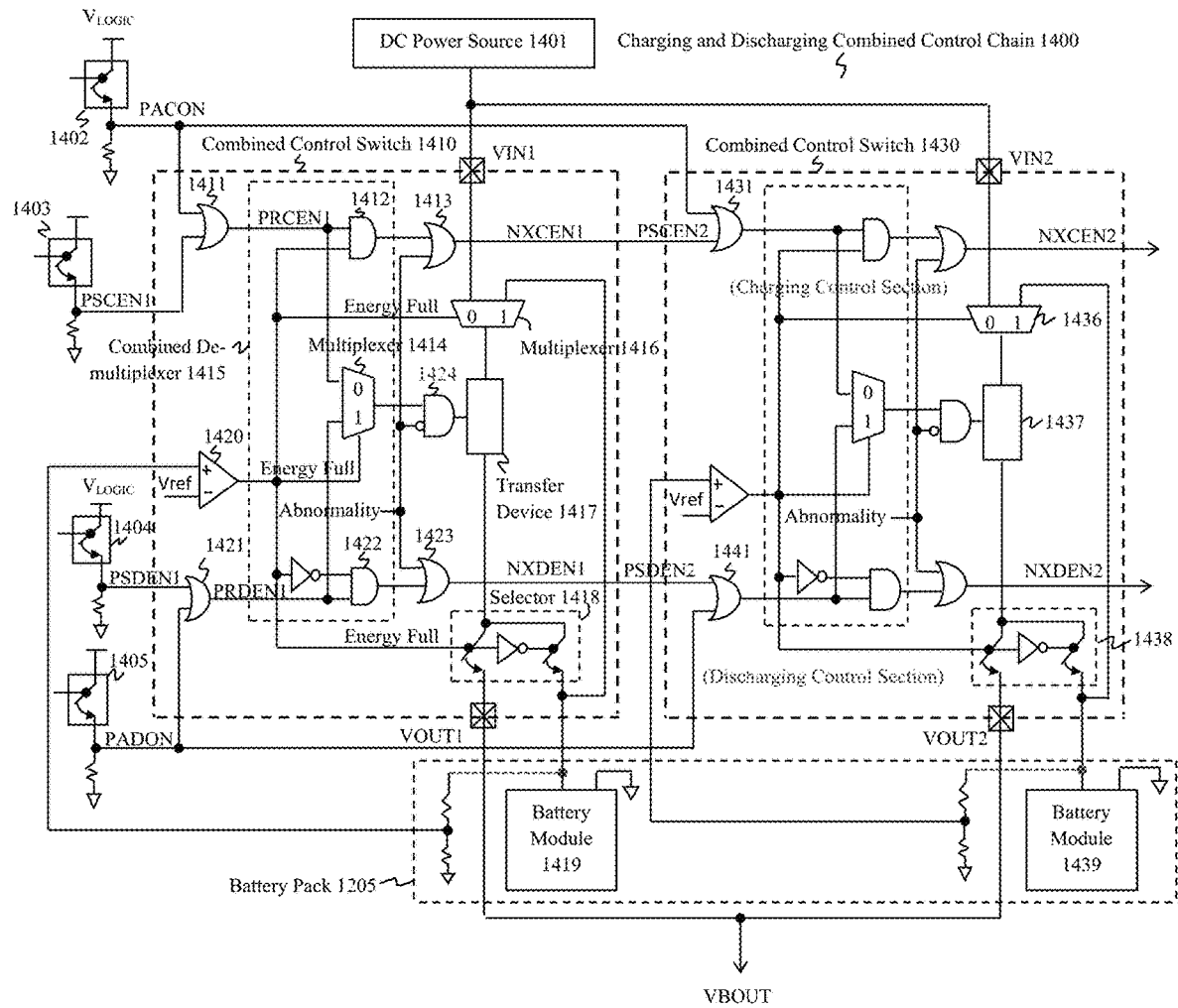
FIG. 14 illustrates an exemplary parallel and sequential charging and discharging control chain, in accordance with one embodiment of the present disclosure.

FIG. 14 is an exemplary charging and discharging control chain 1400 configured by two combined control switches 1410, 1430, in accordance with one embodiment of the present disclosure. Although only two stages are shown in the example, it is applicable to more than two stages.

The combined control switch 1410 includes a charging input OR gate 1411, which receives a sequential enable input PSCEN1 plus a second enable input PACON for charging control, and a discharging input OR gate 1421, which receives a sequential enable input PSDEN1 plus a second enable input PADON for discharging control.

The combined control switch 1410 also includes an output enable OR gate 1413, which receives the positivity output from the combined demultiplexer 1415 and the abnormality detection result to generate NXCEN1 signal to enable the charging control for a subsequent combined control switch 1430, and also includes an output enable OR gate 1423, which receives the negativity output from the combined demultiplexer 1415 and the abnormality detection output to generate NXDEN1 signal to enable the discharging control for the subsequent combined control switch 1430. An embedded transfer device 1417 is activated by the output of multiplexer 1414, gated by the inversion of the abnormality detection result at AND 1424. The detection of any abnormality will de-activate the transfer device 1417 and assert both NXCEN1 and NXDEN1 enable signals to enable the charging control section and the discharging control section of the subsequent combined control switch.

Similarly, the combined control switch 1430 includes OR gate 1431, 1441, which receives the NXCEN1, NXDEN1 output from the front combined control switch 1410 for linking to the PSCEN2, PSDEN2 input, plus receiving the PACON, PADON input, respectively.

The PSCEN1, PSDEN1, PACON or PADON may be asserted by closing the key switches 1403, 1404, 1402 or 1405, or by using an external micro-controller, to enable the sequential charging, sequential discharging, parallel charging, or parallel discharging of the combined control chain 1400. When battery module does not have sufficient energy, the battery module 1419, 1439 will be charged by DC power source 1401 through multiplexer 1416, 1436, transfer device 1417, 1437, and selector 1418, 1438 according to the priority of combined control switch 1410, 1430 coupled to the battery module 1419, 1439, if the PSCEN1 enable signal is asserted to charge battery module 1419, 1439 sequentially. All battery modules 1419, 1439 will be charged concurrently, if the PACON enable signal is asserted.

Similarly, when battery modules have sufficient energy, the battery modules 1419, 1439 will be discharged through multiplexer 1416, 1436, transfer device 1417, 1437, and selector 1418, 1438 to output energy for external use according to the priority of combined control switch 1410, 1430 coupled to the battery module 1419, 1439, if the PSDEN1 enable signal is asserted for energy in battery module 1419, 1439 to be discharged sequentially. All battery modules 1419, 1439 will be discharged concurrently, if the PACON enable signal is asserted.

By using the combined control switch to implement a charging and discharging control chain in a power system, the number of control switches can be reduced by half.

CONCLUSION

In summary, the embodiment to incorporate a 1:2 demultiplexer in control switch enables the linking of control switches into a control chain for charging, discharging or power multiplexing in a power system. The control switch can be configured as a charging control switch, a discharging control switch, a charging or discharging selectable control switch, or a charging and discharging combined control switch. The flexibility to control the delay at the demultiplexer output of control switch enables concurrent, make-before-break or break-before-make power multiplexing between the control switches linked in a control chain.

Partitioning a large energy storage device into multiple smaller energy storage units provides more flexibility in controlling the charging and discharging of the large energy storage device, such as a battery pack in an electric vehicle. If the battery pack in an EV is partitioned into smaller, removable and easily installable battery modules, it would be more feasible to recover regenerated energies, more friendly to manage the charging of EV battery, and may also lower the EV ownership cost. The control switch may be configured with discrete components, in integrated circuits, or partitioned into a chipset including a separate transfer device to meet various power application requirements.

What is claimed is:
1. An apparatus for energy switching control, wherein the apparatus comprises a control section and a transfer section, wherein the transfer section comprises:
   a power input port to receive energy;
   a power output port; and
   a transfer device adapted to transfer energy from the power input port to charge an energy device coupled to the power output port when the transfer device is enabled;
   and the control section comprises:
   a control input port to receive an enable input signal;
   a control output port to output an enable output signal;
   a status output port to monitor status of the transfer device;
   an inhibit input port to receive an inhibit signal to negate the transfer device and to assert the enable output signal to a successive apparatus when the enable input signal is asserted;
   a circuit adapted to compare an input voltage coupled to the energy device with a reference voltage to generate a detection output in response;
   a charging control signal adapted to control charging operation of the energy device; and a demultiplexer comprising:
  a demultiplexer input coupled to the enable input signal;
  a select control signal generated by Boolean operation of the charging control signal and the detection output to enable one of two demultiplexer outputs:
  a positivity output signal generated by ANDing the demultiplexer input with the select control signal; and
  a negativity output signal generated by ANDing the demultiplexer input with an inverse of the select control signal; wherein
  one of the positivity output signal or the negativity output signal is coupled to the transfer device; and
  the other one of the positivity output signal or the negativity output signal is coupled to the enable output signal to enable a succeeding apparatus.

2. The apparatus of claim 1, wherein the status output port is coupled to a transfer enable signal input to the transfer device; and
  the inhibit input port and the status output port form a control pair to control operation of the apparatus.

3. The apparatus of claim 1, wherein both the positivity output signal and the negativity output signal are negated when the enable input signal is de-asserted; and wherein the demultiplexer controls switching between the apparatus and the succeeding apparatus when the enable input signal is asserted.

4. The apparatus of claim 1, wherein the comparator output is saturated to a logic high value when the comparator input voltage is above the reference voltage, and the comparator output is saturated to a logic low value when the comparator input voltage is lower than the reference voltage.

5. The apparatus of claim 1, wherein when inputs to the comparator are interchanged, the comparator output changes state thus causing state change of the select control signal input to the demultiplexer.

6. The apparatus of claim 1, wherein the reference voltage is selected from a group consisting of an external input voltage, and an internal voltage.

7. The apparatus of claim 1, wherein adjusting delay timing of the positivity output signal and the negativity output signal in the apparatus to achieve one of power multiplexing:
  the transfer device in the apparatus and the transfer device in the succeeding apparatus change state concurrently;
  the transfer device in the apparatus is switched off before the transfer device in the succeeding apparatus is switched on, prompting a break-before-make power multiplexing operation; and
  the transfer device in the succeeding apparatus is switched on before the transfer device in the apparatus is switched off, prompting a make-before-break power multiplexing operation.

8. The apparatus of claim 1, wherein the positivity output timing is adjusted by including a delay element along a timing path of the positivity output signal, wherein the delay element is selected from a group consisting of
  a direct wiring interconnect,
  a buffer,
  an even number of inverters,
  a delay-line, and
  a programmable delay-line.

9. The apparatus of claim 1, wherein the negativity output timing is adjusted by including an inverting delay element along a timing path to the negativity output signal, wherein the inverting delay element is selected from a group consisting of
  an open drain inverter,
  an inverting buffer,
  an odd number of inverters,
  an inverting delay-line, and
  an inverting programmable delay-line.

10. The apparatus of claim 1, wherein the apparatus is a charging control switch when the power input port is configured to receive energy from a DC power source, and the comparator is configured to monitor energy on the energy device coupled to the power output port.

11. The apparatus of claim 1, wherein the select control signal of the demultiplexer is derived by selecting one of:
  coupling the charging control signal with the comparator output;
  coupling the charging control signal with an inverted comparator output;
  coupling the comparator output with the inhibit signal;
  coupling the comparator output with one or more signals representative of one or more qualifying condition; and
  coupling an inverted comparator output with one or more signals representative of one or more qualifying conditions.

12. The apparatus of claim 1, wherein
adjusting delay in the positivity output signal and the negativity output signal so that the transfer device in the apparatus and the transfer device in the succeeding apparatus switch substantially at a same time to prompt a concurrent switching between the apparatus and the succeeding apparatus when the select control signal changes state.

13. The apparatus of claim 1, wherein
the positivity output signal is coupled to the transfer device in the apparatus,
the negativity output signal is coupled to the enable output signal to enable the succeeding apparatus, and wherein
disposing a delay device to extend delay to the negativity output signal adapted to switch-off the transfer device in the apparatus before switch-on the transfer device of the succeeding apparatus prompts a break-before-make power multiplexing, when the select control signal changes from a logic high to a logic low level.

14. The apparatus of claim 1, wherein
the positivity output signal is coupled to the transfer device in the apparatus,
the negativity output signal is coupled to the enable output signal to enable the succeeding apparatus, and wherein
disposing a delay device to extend delay to the positivity output signal adapted to switch-on the succeeding apparatus before switch-off the transfer device in the apparatus prompts a make-before-break power switching when the select control signal changes from a logic high to a logic low level.

15. The apparatus of claim 1, wherein
the negativity output signal is coupled to the transfer device in the apparatus,
the positivity output signal is coupled to the enable output signal to enable the succeeding apparatus, and wherein
disposing a delay device to extend delay to the positivity output signal adapted to switch-off the transfer device in the apparatus before switch-on the succeeding apparatus prompts a break-before-make power multiplexing, when the select control signal changes from a logic low to a logic high level.

16. The apparatus of claim 1, wherein
the negativity output signal is coupled to the transfer device in the apparatus,
the positivity output signal is coupled to the enable output signal to enable the succeeding apparatus, and wherein
disposing a delay device to extend delay to the negativity output signal adapted to switch-on the transfer device of the succeeding apparatus before switch-off the transfer device in the apparatus prompts a make-before-break power multiplexing, when the select control signal changes from a logic high to a logic low.

17. The apparatus of claim 1, wherein the transfer section and the control section are formed in an integrated circuit.

18. The apparatus of claim 1, wherein the transfer section is formed in a first integrated circuit and the control section is formed on a second integrated circuit.

19. The apparatus of claim 1, wherein the apparatus is formed using discrete devices.

20. The apparatus of claim 1, wherein apparatus is embedded in a power control system.

21. The apparatus of claim 1, wherein
the energy device is coupled to the power output port and the comparator output is coupled to the charging control signal to generate the select control signal,
the negativity output signal is coupled to the transfer device in the transfer section, the positivity output signal is coupled to the enable output signal to the succeeding apparatus, and
when the enable input signal is asserted and the inhibit signal is negated, wherein
when the comparator input voltage derived from the energy device is below a predefined value, the comparator output saturates to a logic low value, the select control signal is negated:
negation of the select control signal (i) asserts the negativity output signal for the transfer device to enable a DC power source to charge the energy device coupled to the power output port, and (ii) negates the positivity output signal to negate the enable output signal to the succeeding apparatus; and
when the comparator input voltage derived from the energy device is above the predefined level, the comparator output saturates to a logic high value, the select control signal is asserted:
assertion of the select control signal (i) negates the negativity output signal for the transfer device to disconnect the DC power source from charging the energy device, and (ii) asserts the positivity output signal to enable the succeeding apparatus.

22. The apparatus of claim 1, wherein
the select control signal is derived by an AND operation of the comparator output with the charging control signal and one or more signals representative of one or more abnormality conditions to control enable of the transfer device,
assertion of the signals representative of one or more abnormality conditions negates the transfer device in the apparatus and asserts the enable output signal to enable the succeeding apparatus.

23. The apparatus of claim 1, wherein
the select control signal is derived by ANDing with one or more signals each representative of an abnormality condition comprising:
insufficient energy to the power input port,
over-voltage at the power input port,
over-temperature,
over-current,
short-circuit,
an external inhibit control signal to disable the transfer device,
wherein a detection of the one or more abnormality signals negates the transfer device in the apparatus and asserts the enable output signal to enable the second apparatus.

24. The apparatus of claim 1, wherein
when the AND operation is converted to a NAND operation, the positivity output signal is converted to the negativity output signal and the negativity output signal is converted to the positivity output signal, and
when the NAND operation is converted into an OR operation, all inputs to the OR operation are inverted.

25. The apparatus of claim 1, wherein a second enable input signal is ORed with the enable input signal to generate an ORed enable input signal to the demultiplexer.

26. The apparatus of claim 1, wherein the energy device is a battery; wherein the transfer device transfers energy received from the power input port to the power output port to store energy in the battery during a charging operation.

* * * * *